(12) United States Patent
Bennett et al.

(10) Patent No.: US 9,070,166 B2
(45) Date of Patent: Jun. 30, 2015

(54) CENTRALIZED, ONLINE MULTI-SELLER INTERFACE SYSTEM

(75) Inventors: James D. Bennett, Hroznetin (CZ); Christopher C. Winslade, Chicago, IL (US)

(73) Assignee: Enpluz, LLC, Austin, TX (US)

( * ) Notice: Subject to any disclaimer, the term of this patent is extended or adjusted under 35 U.S.C. 154(b) by 616 days.

(21) Appl. No.: 13/400,220

(22) Filed: Feb. 20, 2012

(65) Prior Publication Data

US 2012/0158481 A1 Jun. 21, 2012

Related U.S. Application Data

(63) Continuation of application No. 13/109,093, filed on May 17, 2011, now Pat. No. 8,181,851, which is a continuation of application No. 12/467,557, filed on May 18, 2009, now Pat. No. 7,942,316, which is a continuation of application No. 09/808,717, filed on Mar. 14, 2001, now Pat. No. 7,539,628, application No. 13/400,220, which is a continuation of application No. 13/224,052, filed on Sep. 1, 2011, now Pat. No. 8,256,668, which is a continuation of application No. 09/808,722, filed on Mar. 14, 2001, now Pat. No.

(Continued)

(51) Int. Cl.
G06Q 40/08 (2012.01)
G06Q 20/20 (2012.01)
G06Q 30/02 (2012.01)
G06Q 30/06 (2012.01)
G06Q 40/02 (2012.01)
G06Q 40/04 (2012.01)

(52) U.S. Cl.
CPC ............... *G06Q 40/08* (2013.01); *G06Q 20/20* (2013.01); *G06Q 30/02* (2013.01); *G06Q 30/0207* (2013.01); *G06Q 30/0222* (2013.01); *G06Q 30/0224* (2013.01); *G06Q 30/0235* (2013.01); *G06Q 30/0239* (2013.01); *G06Q 30/0244* (2013.01); *G06Q 30/0251* (2013.01); *G06Q 30/0253* (2013.01); *G06Q 30/0255* (2013.01); *G06Q 30/0257* (2013.01); *G06Q 30/0261* (2013.01); *G06Q 30/0269* (2013.01); *G06Q 30/0601* (2013.01); *G06Q 30/0605* (2013.01); *G06Q 30/0611* (2013.01); *G06Q 30/0613* (2013.01); *G06Q 30/0625* (2013.01); *G06Q 30/0641* (2013.01); *G06Q 40/025* (2013.01); *G06Q 40/04* (2013.01)

(58) Field of Classification Search
USPC ............... 705/14.23, 26.1, 26.2, 26.4, 26.62, 705/27.1, 14.1, 14.35, 14.43, 14.66, 14.73; 235/26.2, 26.4, 376, 383
See application file for complete search history.

(56) References Cited

U.S. PATENT DOCUMENTS

| 4,882,675 A | 11/1989 | Nichtberger et al. |
| 5,128,861 A | 7/1992 | Kagami et al. |

(Continued)

*Primary Examiner* — Andrew Joseph Rudy
(74) *Attorney, Agent, or Firm* — Garlick & Markison; Bruce E. Garlick

(57) ABSTRACT

A sales portal system supports a plurality of buyer computers used by a corresponding plurality of buyers. The sales portal system supports a first seller's computer to support sales of a first plurality of products a second seller's computer to support sales of a second plurality of products. The sales portal accesses first product data from the first seller's computer and second product data from the second seller's computer and responds to a query received from one of the plurality of buyer computers by delivering selections from the associated first product data and the associated second product data. The sales portal manages a single sales transaction for a first product of a first seller and a second product of a second seller. The sales portal rates sellers. The sales portal apportions payment, fulfillment, delivery instructions, and other sales components to the first and second sellers.

54 Claims, 24 Drawing Sheets

Related U.S. Application Data 8,036,941, application No. 13/400,220, which is a continuation of application No. 13/104,311, filed on May 10, 2011, now Pat. No. 8,177,124, which is a continuation of application No. 12/467,664, filed on May 18, 2009, now Pat. No. 7,938,316, which is a continuation of application No. 09/808,723, filed on Mar. 14, 2001, now Pat. No. 7,542,922, application No. 13/400,220, which is a continuation of application No. 09/687,499, filed on Oct. 13, 2000, now Pat. No. 8,533,039, which is a continuation-in-part of application No. 09/547,162, filed on Apr. 11, 2000, now abandoned.

(60) Provisional application No. 60/214,136, filed on Jun. 26, 2000, provisional application No. 60/214,183, filed on Jun. 26, 2000, provisional application No. 60/190,825, filed on Mar. 21, 2000, provisional application No. 60/213,912, filed on Jun. 26, 2000, provisional application No. 60/214,188, filed on Jun. 26, 2000, provisional application No. 60/130,082, filed on Apr. 19, 1999, provisional application No. 60/130,083, filed on Apr. 19, 1999, provisional application No. 60/130,084, filed on Apr. 19, 1999, provisional application No. 60/131,008, filed on Apr. 23, 1999, provisional application No. 60/144,584, filed on Jul. 19, 1999, provisional application No. 60/146,208, filed on Jul. 28, 1999, provisional application No. 60/147,062, filed on Aug. 4, 1999, provisional application No. 60/159,388, filed on Oct. 14, 1999.

(56) References Cited

U.S. PATENT DOCUMENTS

| | | | |
|---|---|---|---|
| 5,239,462 | A | 8/1993 | Jones et al. |
| 5,264,822 | A | 11/1993 | Vogelman et al. |
| 5,283,731 | A | 2/1994 | Lalonde et al. |
| 5,339,392 | A | 8/1994 | Risberg et al. |
| 5,535,422 | A | 7/1996 | Chiang et al. |
| 5,615,109 | A | 3/1997 | Eder |
| 5,649,114 | A | 7/1997 | Deaton et al. |
| 5,717,989 | A | 2/1998 | Tozzoli et al. |
| 5,724,424 | A | 3/1998 | Gifford |
| 5,729,693 | A | 3/1998 | Holda-Fleck |
| 5,732,398 | A | 3/1998 | Tagawa |
| 5,732,400 | A | 3/1998 | Mandler et al. |
| 5,751,956 | A * | 5/1998 | Kirsch .................... 709/203 |
| 5,765,144 | A | 6/1998 | Larche et al. |
| 5,794,210 | A | 8/1998 | Goldhaber et al. |
| 5,797,133 | A | 8/1998 | Jones et al. |
| 5,799,285 | A | 8/1998 | Klingman |
| 5,842,178 | A | 11/1998 | Giovannoli |
| 5,870,546 | A * | 2/1999 | Kirsch .................... 709/205 |
| 5,870,771 | A | 2/1999 | Oberg |
| 5,897,621 | A | 4/1999 | Boesch et al. |
| 5,903,721 | A | 5/1999 | Sixtus |
| 5,903,874 | A | 5/1999 | Leonard et al. |
| 5,937,391 | A | 8/1999 | Ikeda et al. |
| 5,940,811 | A | 8/1999 | Norris |
| 5,943,424 | A | 8/1999 | Berger |
| 5,948,061 | A | 9/1999 | Merriman et al. |
| 5,950,172 | A * | 9/1999 | Klingman .................... 705/27.1 |
| 5,963,915 | A | 10/1999 | Kirsch |
| 5,984,180 | A | 11/1999 | Albrecht |
| 5,987,434 | A | 11/1999 | Libman |
| 5,999,914 | A | 12/1999 | Blinn et al. |
| 6,009,412 | A | 12/1999 | Storey |
| 6,014,645 | A | 1/2000 | Cunningham |
| 6,029,149 | A | 2/2000 | Dykstra et al. |
| 6,029,195 | A * | 2/2000 | Herz .................... 725/116 |
| 6,052,674 | A | 4/2000 | Zervides et al. |
| 6,055,513 | A | 4/2000 | Katz |
| 6,055,514 | A | 4/2000 | Wren |
| 6,061,660 | A | 5/2000 | Eggleston et al. |
| 6,061,691 | A | 5/2000 | Fox |
| 6,088,686 | A | 7/2000 | Walker et al. |
| 6,098,065 | A | 8/2000 | Skillen et al. |
| 6,101,484 | A | 8/2000 | Halbert et al. |
| 6,108,639 | A | 8/2000 | Walker et al. |
| 6,141,006 | A | 10/2000 | Knowlton et al. |
| 6,141,010 | A | 10/2000 | Hoyle |
| 6,141,653 | A | 10/2000 | Conklin et al. |
| 6,141,915 | A | 11/2000 | Andersen et al. |
| 6,144,948 | A | 11/2000 | Walker et al. |
| 6,151,588 | A | 11/2000 | Tozzoli et al. |
| 6,154,843 | A | 11/2000 | Hart, Jr. et al. |
| 6,167,385 | A | 12/2000 | Hartley-Urquhart |
| 6,175,922 | B1 | 1/2001 | Wang |
| 6,195,649 | B1 | 2/2001 | Gifford |
| 6,199,050 | B1 | 3/2001 | Alaia et al. |
| 6,199,051 | B1 | 3/2001 | Gifford |
| 6,205,433 | B1 | 3/2001 | Boesch et al. |
| 6,205,437 | B1 | 3/2001 | Gifford |
| 6,208,979 | B1 | 3/2001 | Sinclair |
| 6,233,566 | B1 | 5/2001 | Levine et al. |
| 6,236,975 | B1 | 5/2001 | Boe et al. |
| 6,243,691 | B1 | 6/2001 | Fisher et al. |
| 6,253,187 | B1 | 6/2001 | Fox |
| 6,285,983 | B1 | 9/2001 | Jenkins |
| 6,289,319 | B1 | 9/2001 | Lockwood |
| 6,311,169 | B2 | 10/2001 | Duhon |
| 6,317,780 | B1 | 11/2001 | Cohn et al. |
| 6,324,521 | B1 | 11/2001 | Shiota et al. |
| 6,324,524 | B1 | 11/2001 | Lent et al. |
| 6,332,135 | B1 | 12/2001 | Conklin et al. |
| 6,336,098 | B1 | 1/2002 | Fortenberry et al. |
| 6,349,300 | B1 | 2/2002 | Graf et al. |
| 6,353,398 | B1 | 3/2002 | Amin et al. |
| 6,370,514 | B1 | 4/2002 | Messner |
| 6,385,591 | B1 | 5/2002 | Mankoff |
| 6,385,594 | B1 | 5/2002 | Lebda et al. |
| 6,393,436 | B1 | 5/2002 | Vaimberg-Araujo |
| 6,405,181 | B2 | 6/2002 | Lent et al. |
| 6,405,281 | B1 | 6/2002 | Akerib |
| 6,415,291 | B2 | 7/2002 | Bouve et al. |
| 6,430,615 | B1 | 8/2002 | Hellerstein et al. |
| 6,434,607 | B1 | 8/2002 | Haverstock et al. |
| 6,449,599 | B1 | 9/2002 | Payne et al. |
| 6,450,407 | B1 | 9/2002 | Freeman et al. |
| 6,453,302 | B1 | 9/2002 | Johnson et al. |
| 6,453,306 | B1 | 9/2002 | Quelene |
| 6,466,919 | B1 | 10/2002 | Walker et al. |
| 6,466,981 | B1 | 10/2002 | Levy |
| 6,477,575 | B1 | 11/2002 | Koeppel et al. |
| 6,477,580 | B1 | 11/2002 | Bowman-Amuah |
| 6,484,149 | B1 | 11/2002 | Jammes et al. |
| 6,484,153 | B1 | 11/2002 | Walker et al. |
| 6,502,076 | B1 | 12/2002 | Smith |
| 6,505,773 | B1 | 1/2003 | Palmer |
| 6,507,823 | B1 | 1/2003 | Nel |
| 6,519,571 | B1 | 2/2003 | Guheen et al. |
| 6,522,875 | B1 | 2/2003 | Dowling et al. |
| 6,529,885 | B1 | 3/2003 | Johnson |
| 6,530,880 | B2 | 3/2003 | Pagliuca |
| 6,567,791 | B2 | 5/2003 | Lent et al. |
| 6,587,841 | B1 | 7/2003 | Defrancesco et al. |
| 6,594,640 | B1 | 7/2003 | Postrel |
| 6,601,047 | B2 | 7/2003 | Wang et al. |
| 6,604,089 | B1 | 8/2003 | Van Horn et al. |
| 6,606,653 | B1 | 8/2003 | Ackermann, Jr. et al. |
| 6,609,101 | B1 | 8/2003 | Landvater |
| 6,611,816 | B2 | 8/2003 | Lebda et al. |
| 6,615,253 | B1 | 9/2003 | Bowman-Amuah |
| 6,625,581 | B1 | 9/2003 | Perkowski |
| 6,658,390 | B1 | 12/2003 | Walker et al. |
| 6,658,393 | B1 | 12/2003 | Basch et al. |
| 6,678,730 | B2 | 1/2004 | Hellerstein et al. |
| 6,684,196 | B1 | 1/2004 | Mini et al. |
| 6,693,236 | B1 | 2/2004 | Gould et al. |
| 6,735,572 | B2 | 5/2004 | Landesmann |
| 6,757,710 | B2 | 6/2004 | Reed |
| 6,766,302 | B2 | 7/2004 | Bach |

(56) References Cited

U.S. PATENT DOCUMENTS

| | | |
|---|---|---|
| 6,771,290 B1 | 8/2004 | Hoyle |
| 6,785,661 B1 | 8/2004 | Mandler et al. |
| 6,795,812 B1 | 9/2004 | Lent et al. |
| 6,847,942 B1 | 1/2005 | Land et al. |
| 6,868,389 B1 | 3/2005 | Wilkins et al. |
| 6,868,395 B1 | 3/2005 | Szlam et al. |
| 6,895,388 B1 | 5/2005 | Smith |
| 6,898,570 B1 | 5/2005 | Tedesco et al. |
| 6,915,271 B1 | 7/2005 | Meyer et al. |
| 6,928,412 B2 | 8/2005 | DeBiasse |
| 6,934,692 B1 | 8/2005 | Duncan |
| 6,941,282 B1 | 9/2005 | Johnson |
| 6,950,807 B2 | 9/2005 | Brock |
| 6,957,192 B1 | 10/2005 | Peth |
| 6,961,712 B1 | 11/2005 | Perkowski |
| 6,970,852 B1 | 11/2005 | Sendo et al. |
| 6,980,962 B1 | 12/2005 | Arganbright et al. |
| 6,988,085 B2 | 1/2006 | Hedy |
| 7,010,508 B1 | 3/2006 | Lockwood |
| 7,013,289 B2 | 3/2006 | Horn et al. |
| 7,020,625 B2 | 3/2006 | Tiley et al. |
| 7,039,599 B2 | 5/2006 | Merriman et al. |
| 7,039,858 B2 | 5/2006 | Humpleman et al. |
| 7,047,219 B1 | 5/2006 | Martin et al. |
| 7,054,830 B1 | 5/2006 | Eggleston et al. |
| 7,069,234 B1 | 6/2006 | Cornelius et al. |
| 7,082,412 B1 | 7/2006 | Treider et al. |
| 7,096,354 B2 | 8/2006 | Wheeler et al. |
| 7,103,563 B1 | 9/2006 | Voisin et al. |
| 7,103,566 B2 | 9/2006 | Silva et al. |
| 7,103,568 B1 | 9/2006 | Fusz et al. |
| 7,107,227 B1 | 9/2006 | Bezos et al. |
| 7,107,230 B1 | 9/2006 | Halbert et al. |
| 7,117,208 B2 * | 10/2006 | Tamayo et al. ............... 707/777 |
| 7,133,846 B1 | 11/2006 | Ginter et al. |
| 7,133,935 B2 | 11/2006 | Hedy |
| 7,143,063 B2 | 11/2006 | Lent et al. |
| 7,149,710 B1 | 12/2006 | Edmark |
| 7,149,724 B1 | 12/2006 | Flanagan et al. |
| 7,162,451 B2 | 1/2007 | Berger et al. |
| 7,162,458 B1 | 1/2007 | Flanagan et al. |
| 7,165,051 B2 | 1/2007 | Ronning et al. |
| 7,171,371 B2 | 1/2007 | Goldstein |
| 7,181,427 B1 | 2/2007 | DeFrancesco et al. |
| 7,194,436 B2 | 3/2007 | Tammaro |
| 7,194,442 B1 | 3/2007 | Flanagan et al. |
| 7,212,990 B1 | 5/2007 | Greden et |
| 7,219,080 B1 | 5/2007 | Wagoner et al. |
| 7,222,078 B2 | 5/2007 | Abelow |
| 7,222,109 B1 | 5/2007 | Flanagan et al. |
| 7,249,059 B2 * | 7/2007 | Dean et al. ................. 705/14.73 |
| 7,249,097 B2 | 7/2007 | Hutchison et al. |
| 7,289,964 B1 | 10/2007 | Bowman-Amuah |
| 7,310,617 B1 | 12/2007 | Cunningham |
| 7,324,972 B1 | 1/2008 | Oliver et al. |
| 7,337,127 B1 * | 2/2008 | Smith et al. ................. 705/14.66 |
| 7,340,411 B2 | 3/2008 | Cook |
| 7,353,192 B1 | 4/2008 | Ellis et al. |
| 7,353,194 B1 | 4/2008 | Kerker et al. |
| 7,363,267 B1 | 4/2008 | Vincent et al. |
| 7,376,603 B1 | 5/2008 | Mayr et al. |
| 7,379,900 B1 | 5/2008 | Wren |
| 7,395,259 B2 | 7/2008 | Bailey et al. |
| 7,415,617 B2 | 8/2008 | Ginter et al. |
| 7,426,480 B2 | 9/2008 | Granger et al. |
| 7,430,528 B2 | 9/2008 | Perkowski |
| 7,451,114 B1 | 11/2008 | Matsuda et al. |
| 7,467,100 B2 | 12/2008 | Matsumori |
| 7,490,126 B2 | 2/2009 | Ozzie et al. |
| 7,490,293 B1 | 2/2009 | Humpleman et al. |
| 7,496,943 B1 | 2/2009 | Goldberg et al. |
| 7,505,939 B2 | 3/2009 | Lent et al. |
| 7,516,089 B1 | 4/2009 | Walker et al. |
| 7,536,318 B1 | 5/2009 | Wolfe et al. |
| 7,539,628 B2 | 5/2009 | Bennett et al. |
| 7,542,922 B2 | 6/2009 | Bennett et al. |
| 7,610,221 B2 | 10/2009 | Cella et al. |
| 7,610,238 B2 | 10/2009 | Togher et al. |
| 7,620,565 B2 | 11/2009 | Abelow |
| 7,627,531 B2 | 12/2009 | Breck et al. |
| 7,630,919 B1 * | 12/2009 | Obrecht ....................... 705/26.4 |
| 7,630,986 B1 | 12/2009 | Herz et al. |
| 7,637,426 B1 | 12/2009 | Green |
| 7,660,751 B2 | 2/2010 | Cella et al. |
| 7,660,752 B2 | 2/2010 | Cella et al. |
| 7,668,782 B1 | 2/2010 | Reistad et al. |
| 7,685,537 B2 | 3/2010 | Hoyle |
| 7,689,590 B2 | 3/2010 | Fox |
| 7,711,598 B2 | 5/2010 | Perkowski |
| 7,729,945 B1 | 6/2010 | Katz et al. |
| 7,729,959 B1 | 6/2010 | Wells et al. |
| 7,742,966 B2 | 6/2010 | Erlanger |
| 7,761,345 B1 | 7/2010 | Martin et al. |
| RE41,619 E | 8/2010 | Boesch et al. |
| 7,769,681 B2 | 8/2010 | Misraje et al. |
| 7,778,884 B2 | 8/2010 | Bamborough et al. |
| 7,792,297 B1 | 9/2010 | Piccionelli et al. |
| 7,801,775 B1 | 9/2010 | Roseman et al. |
| 7,813,966 B2 | 10/2010 | Alaia et al. |
| 7,818,212 B1 | 10/2010 | Mesaros |
| 7,818,415 B2 * | 10/2010 | Jhanji ......................... 709/223 |
| 7,835,508 B1 | 11/2010 | Katz |
| 7,870,189 B2 | 1/2011 | Philyaw |
| 7,895,097 B2 | 2/2011 | Dang et al. |
| 7,908,226 B2 | 3/2011 | Hutchison et al. |
| 7,921,038 B2 | 4/2011 | Matsuda et al. |
| 7,933,806 B2 | 4/2011 | Fusz et al. |
| 7,937,282 B2 | 5/2011 | Walser et al. |
| 7,937,312 B1 | 5/2011 | Woolston |
| 7,938,316 B2 | 5/2011 | Bennett et al. |
| 7,942,316 B2 | 5/2011 | Bennett et al. |
| 7,949,578 B2 | 5/2011 | Johnson et al. |
| 7,958,007 B2 | 6/2011 | Urbanski et al. |
| 7,958,018 B2 * | 6/2011 | Obrecht ....................... 705/26.4 |
| 7,970,652 B1 | 6/2011 | Woolston |
| 7,974,889 B2 | 7/2011 | Raimbeault |
| 7,991,649 B2 | 8/2011 | Libman |
| 8,015,076 B2 | 9/2011 | Owens |
| 8,036,941 B2 | 10/2011 | Bennett et al. |
| 8,041,604 B1 | 10/2011 | Glaser |
| 8,050,974 B2 | 11/2011 | Lopez et al. |
| 8,051,078 B2 | 11/2011 | Lau et al. |
| 8,065,201 B2 | 11/2011 | Perkowski |
| 8,112,356 B2 | 2/2012 | Schultz |
| 8,117,120 B2 | 2/2012 | Misraje et al. |
| 8,131,597 B2 | 3/2012 | Hudetz et al. |
| 8,145,544 B2 | 3/2012 | Leal |
| 8,145,563 B2 | 3/2012 | Misraje et al. |
| 8,146,799 B2 | 4/2012 | Kempf et al. |
| 8,177,124 B2 | 5/2012 | Bennett et al. |
| 8,181,851 B2 | 5/2012 | Bennett et al. |
| 8,185,473 B2 | 5/2012 | Ginter et al. |
| 8,190,492 B2 | 5/2012 | Berlin et al. |
| 8,190,528 B2 | 5/2012 | Ginter et al. |
| 8,191,158 B2 | 5/2012 | Ginter et al. |
| 8,219,450 B2 | 7/2012 | Hellal et al. |
| 8,219,584 B2 | 7/2012 | Starr |
| 8,234,164 B2 | 7/2012 | Walker et al. |
| 8,291,238 B2 | 10/2012 | Ginter et al. |
| 8,369,263 B2 | 2/2013 | Dowling et al. |
| 8,403,217 B2 | 3/2013 | Bennett et al. |
| 8,407,334 B2 | 3/2013 | Bennett et al. |
| 8,423,423 B1 | 4/2013 | Lopez et al. |
| 8,428,752 B2 | 4/2013 | Bennett et al. |
| 8,458,032 B2 | 6/2013 | Giraud et al. |
| 8,458,055 B2 | 6/2013 | Perkowski |
| 8,468,053 B2 | 6/2013 | Bennett et al. |
| 8,498,898 B1 | 7/2013 | Kogen et al. |
| 8,499,324 B1 * | 7/2013 | Mitchell et al. ................. 725/76 |
| 8,521,588 B2 * | 8/2013 | McElfresh et al. ........ 705/14.43 |
| RE44,502 E | 9/2013 | Boesch et al. |
| 8,527,337 B1 * | 9/2013 | Lim et al. .................... 705/14.35 |
| 8,533,038 B2 * | 9/2013 | Bergh et al. ................ 705/14.35 |
| 8,533,047 B2 | 9/2013 | Alvin |

(56) References Cited

U.S. PATENT DOCUMENTS

| | | |
|---|---|---|
| 8,548,871 B2 | 10/2013 | Walker et al. |
| 8,560,396 B2 | 10/2013 | Peckover |
| 8,566,154 B2 | 10/2013 | Merriman et al. |
| 8,573,491 B2 | 11/2013 | Bennett et al. |
| 8,620,740 B2 * | 12/2013 | Bergh et al. ............ 705/14.35 |
| 8,620,758 B2 | 12/2013 | Wren |
| 8,650,126 B2 | 2/2014 | Kwan |
| 8,700,453 B2 | 4/2014 | Scroggie et al. |
| 8,788,432 B2 | 7/2014 | Junger |
| 8,818,854 B2 | 8/2014 | Bennett et al. |
| 8,849,693 B1 * | 9/2014 | Koyfman et al. ............ 705/14.1 |
| 2001/0032229 A1 | 10/2001 | Hulls et al. |
| 2002/0029186 A1 | 3/2002 | Roth et al. |
| 2002/0052778 A1 | 5/2002 | Murphy |
| 2003/0055729 A1 | 3/2003 | Bezos et al. |
| 2003/0200146 A1 | 10/2003 | Levin et al. |
| 2003/0200179 A1 | 10/2003 | Kwan |
| 2008/0091537 A1 | 4/2008 | Miller et al. |

* cited by examiner

| Review Selection | Buy Selection |

Seller: Dell Computer Corp. *****
 $1999.00 - Pentium 300MHz PII, 15" Monitor ...
 $2299.00 - Pentium 350MHz PII, 15" Monitor ...

Seller: Compaq Computer Corp. *****
 $1699.00 - Pentium 200MHz MMX, 17" Monitor ...
 $2199.00 - Pentium 300MHz PII, 15" Monitor ...
 $499.00 - 15" IBM Flatscreen Monitor, NI, ...

Seller: ABC Computer Corp. **
 $1599.00 - Compaq Pentium 300MHz PII, No Monitor ...
 $2499.00 - IBM Pentium 300MHz PII, 15" Monitor ...
 $2899.00 - IBM Pentium 350MHz PII, 17" Monitor ...

FIG. 10

CENTRALIZED, ONLINE MULTI-SELLER INTERFACE SYSTEM

CROSS-REFERENCE TO RELATED APPLICATIONS

This application is a continuation of the following applications:

U.S. application Ser. No. 13/109,093, filed May 17, 2011, which is a continuation of U.S. application Ser. No. 12/467,557, filed May 18, 2009, now issued as U.S. Pat. No. 7,942,316, which is a continuation of U.S. application Ser. No. 09/808,717, filed Mar. 14, 2001, now issued as U.S. Pat. No. 7,539,628, which is based on and claims the benefit of U.S. Provisional Nos. 60/214,136, filed Jun. 26, 2000, 60/214,183, filed Jun. 26, 2000, and 60/190,825, filed Mar. 21, 2000;

U.S. application Ser. No. 13/224,052, filed Sep. 1, 2011, which is a continuation of U.S. application Ser. No. 09/808,722, filed Mar. 14, 2001, now issued as U.S. Pat. No. 8,036,941, which is based on and claims the benefit of U.S. Provisional Nos. 60/213,912, filed Jun. 26, 2000, 60/214,183, filed Jun. 26, 2000, and 60/190,825, filed Mar. 21, 2000;

U.S. application Ser. No. 13/104,311, filed May 10, 2011, which is a continuation of U.S. application Ser. No. 12/467,664, filed May 18, 2009, now issued as U.S. Pat. No. 7,938,316, which is a continuation of U.S. application Ser. No. 09/808,723, filed Mar. 14, 2001, now issued as U.S. Pat. No. 7,542,922, which is based on and claims the benefit of U.S. Provisional Nos. 60/190,825, filed Mar. 21, 2000, 60/214,183, filed Jun. 26, 2000, and 60/214,188, filed Jun. 26, 2000; and U.S. application Ser. No. 09/687,499, filed Oct. 13, 2000, which is a continuation-in-part of U.S. application Ser. No. 09/547,162, filed Apr. 11, 2000, now abandoned, which is based on and claims the benefit of U.S. Provisional Nos. 60/130,082, filed Apr. 19, 1999, 60/130,083, filed Apr. 19, 1999, 60/130,084, filed Apr. 19, 1999; 60/131,008, filed Apr. 23, 1999, 60/144,584, filed Jul. 19, 1999, 60/146,208, filed Jul. 28, 1999, 60/147,062, filed Aug. 4, 1999, and 60/159,388, filed Oct. 14, 1999.

The above-identified applications are all hereby incorporated herein by reference in their entirety and constitute part of the present application.

BACKGROUND

1. Technical Field

The present invention relates generally to online sales and marketing, and, more specifically, to online sales during online purchase on the Internet.

2. Related Art

The past ten years have seen tremendous growth in online Internet sales. Integration of key sales functions into sales software and hardware systems account for much of the penetration of online sales systems by manufacturers, distributors, and retailers. As buyers become more comfortable with Internet and online credit card processing, and begin to appreciate the associated ease and benefits of online purchasing, online sales revenues should experience exceptional growth. For 1998, online sales reached approximately 60 billion dollars in revenue, while projections for 2003 anticipate over 1.4 trillion. Corporate buyers and sellers generate over 90% of such revenues.

Conventional sales systems, such as (1) sales or shopping robot ("shopping bot" or "sales bot") systems, (2) purported instant rebate and coupon systems, (3) auctioning systems, (4) parallel web hosted systems, (5) custom sales channel software development, etc., however, are deficient in many respects and offer only partial solutions. For example, the above systems require an excessive investment of human labor for operation, suffer from inherent and significant deficiencies in performance, and have difficulties in collecting revenue.

More specifically, shopping bots act as a front end to the sales process by attempting to assist an individual buyer in comparison shopping of items across sellers on the web. Shopping bots require human intensive interaction not only in setting up an interface to each seller's site, but also in the ongoing maintenance of each interface to each seller's site. Shopping bots attempt to read and process information from the web pages of each seller's site which are often changed or deleted or moved to a differing URL. Shopping bots also fail to identify new products at each seller's site without having an employee revisit the seller's site, revisit all the links there, identify new URL's and associated new web page content, and formulate new interfaces thereto.

Without (and often in spite of) sufficient employee interaction, shopping bots will and do suffer from providing incorrect, incomplete and outdated information. Shopping bots also (1) fail to provide interfaces with underlying seller product information, e.g., further database information involved in the selection process only available during buyer purchasing, hypertext linked ("nested") product information, etc., (2) fail to provide interfaces with underlying, backend database information, e.g., inventory, restocking schedules, etc., (3) cannot determine whether or not a purchase was made, making it difficult to collect revenues, (4) cannot perform credit card transaction processing, (5) cannot handle order fulfillment, and so on.

Purported online, instant coupons and rebate sites also suffer with many of the same deficiencies. For example, without human intervention, no mechanisms exist for (1) verifying that a manufacturer's rebate or coupon applies to an independent retailer's offering; (2) instantly applying such rebates or coupons; (3) placing control in the manufacturer for designating or modifying the number of distributed and/or applied coupons or rebates in real time; and (4) advertising a rebate or coupon on any web server selected by the manufacturer with processing through another. Thus, purported instant coupon and rebate sites require human intensive processing, and merely vector buyers to sellers' publicly offered web pages that indicate, in a poor attempt at mimicking instant processing, that a coupon is being applied.

Online auction systems also suffer from many of the same problems. Among such problems, and perhaps most importantly, conventional online auction systems fail to provide sufficient integration with sellers to enable automated, effective use of auctioning as a vehicle to "dump" excess or discontinued inventory or for promotional purposes.

Custom software development within a wholly controlled sales channel provides a costly approach for exchanging product information, pricing, etc. When the sales channel is not wholly controlled, such information is difficult if not impossible to collect. For example, a manufacture may not be able to afford the cost of integrating with a plurality of distributors and retailers that also sell other manufacturers' goods, wherein each use significantly different sales systems that often change.

Many other problems and disadvantages associated with prior systems will become apparent to one of skill in the art upon review of such prior systems and in light of the teachings herein.

SUMMARY OF THE INVENTION

The present invention relates to an add-on or enhancement to the current e-commerce marketplace. The present invention may integrate into the current online sales or act as a means to replace current online retailers that carry no inventory. The present invention enables a system to position itself between each buyer and seller for every Internet sales transaction. Such positioning involves offering buyers a unique and exclusive Internet sales presence that simplifies the sales process, while providing sellers with better sales information, seller to seller interaction, and additional sales opportunities. The present invention offers a modular product line and application toolkit targeting not only on the independent buyer, but also corporate buyers where the majority of sales transactions occur.

Many other aspects and variations of the promotion system of the present invention can be appreciated by one of skill in the art through review of the detailed description, corresponding drawings, and claims.

BRIEF DESCRIPTION OF THE DIAGRAMS

The numerous objects and advantages of the present invention may be better understood by those skilled in the art by reference to the accompanying figures in which:

FIG. 10 is a diagram illustrating a list of products with prices provided to Buyer by the MSIS in the present invention;

Figure 23:
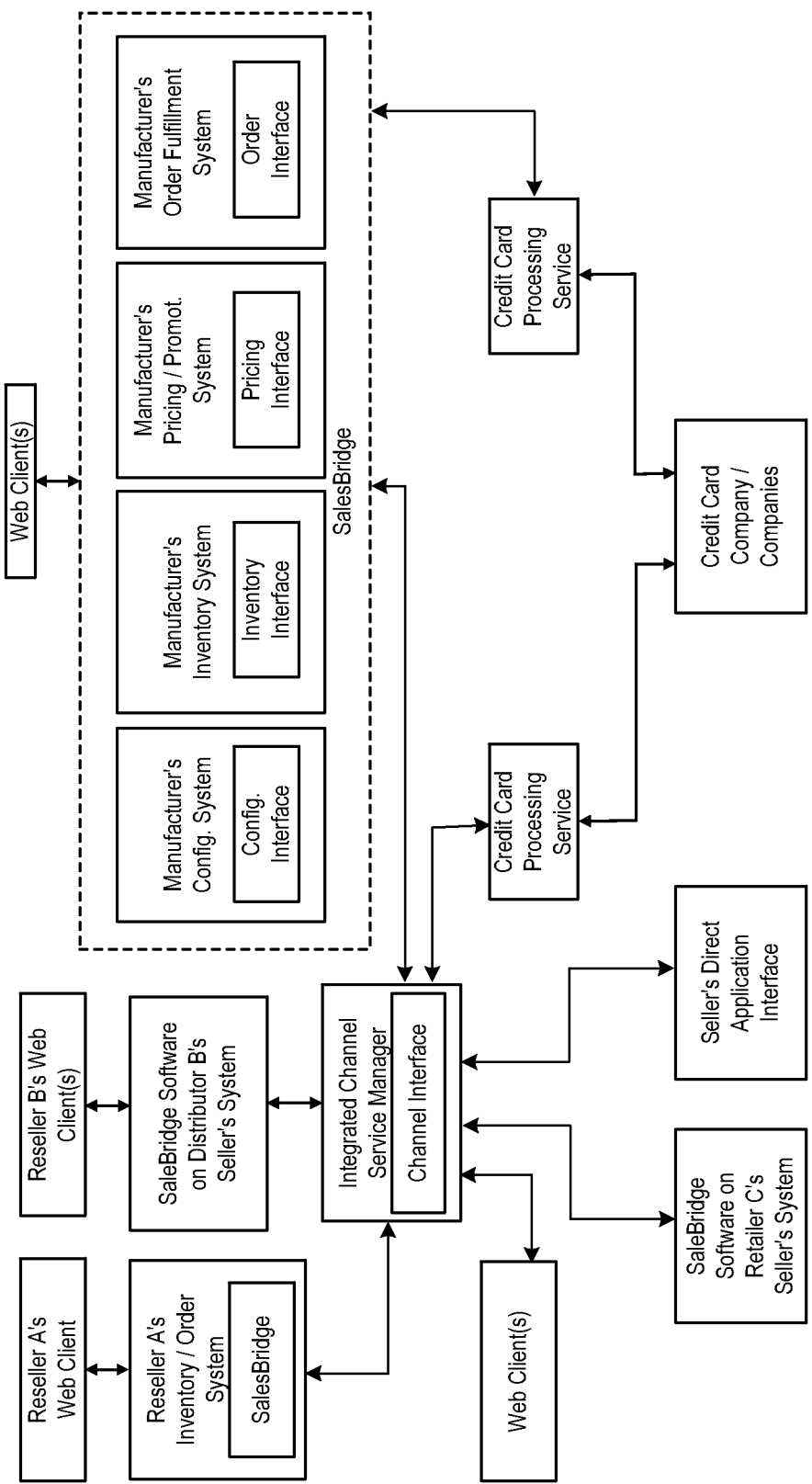
Figure 24:
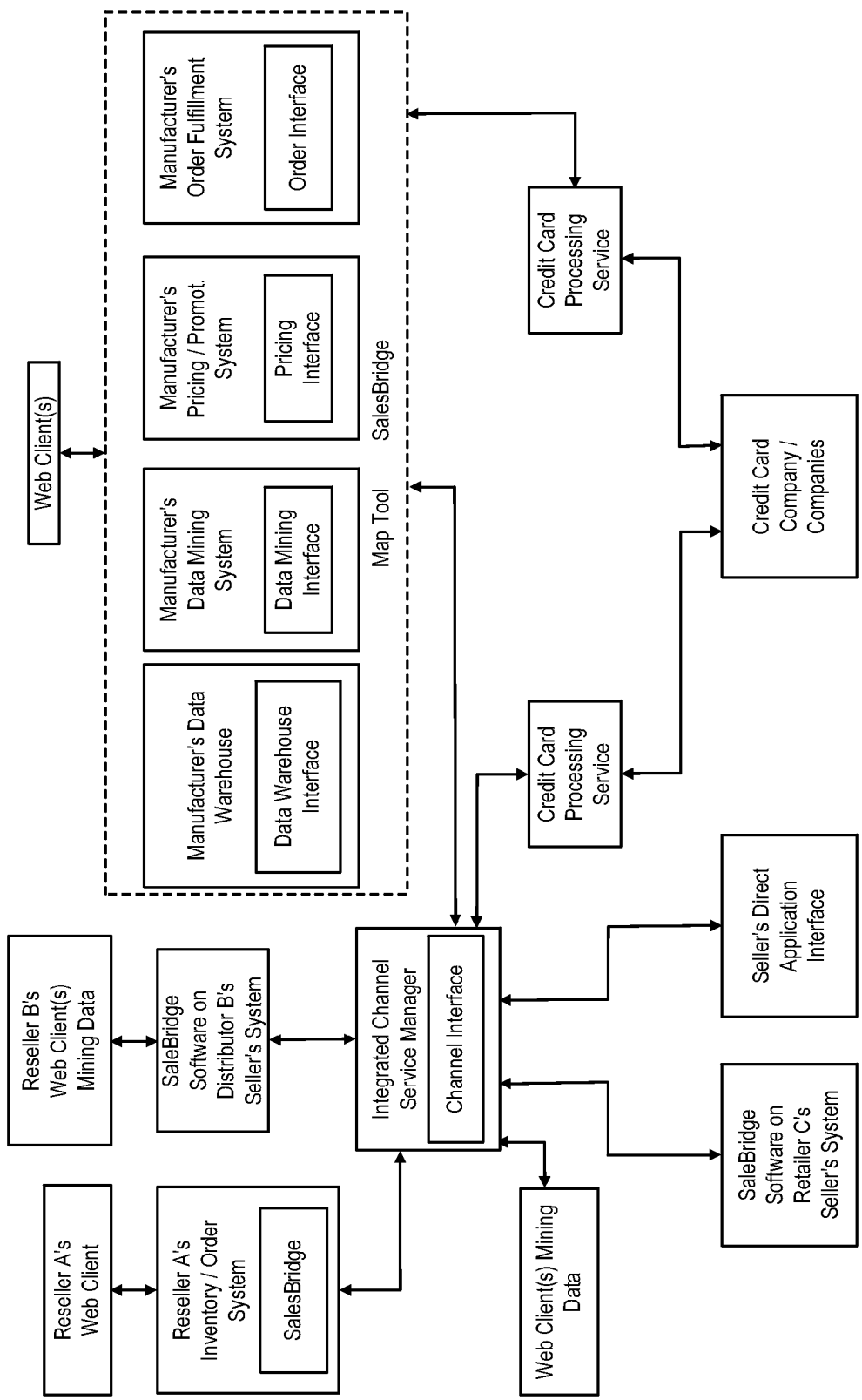

FIG. 23 is a schematic diagram of an Integrated Channel System comprising an Integrated Channel Service Manager, a manufacturer environment comprising an Inventory system, a Pricing system, a Configuration system, and an Order fulfillment system, a Reseller system for Reseller A comprising an inventory system and an order system, a Reseller system for Distributor B comprising a Seller's system, and a Retailer system for Retailer C comprising a Seller's system in accordance with the present invention; and FIG. 24 is a schematic diagram of an Integrated Channel System comprising an Integrated Channel Service Manager and a manufacturer environment in accordance with the present invention.

DETAILED DESCRIPTION OF THE DIAGRAMS

Figure 1:
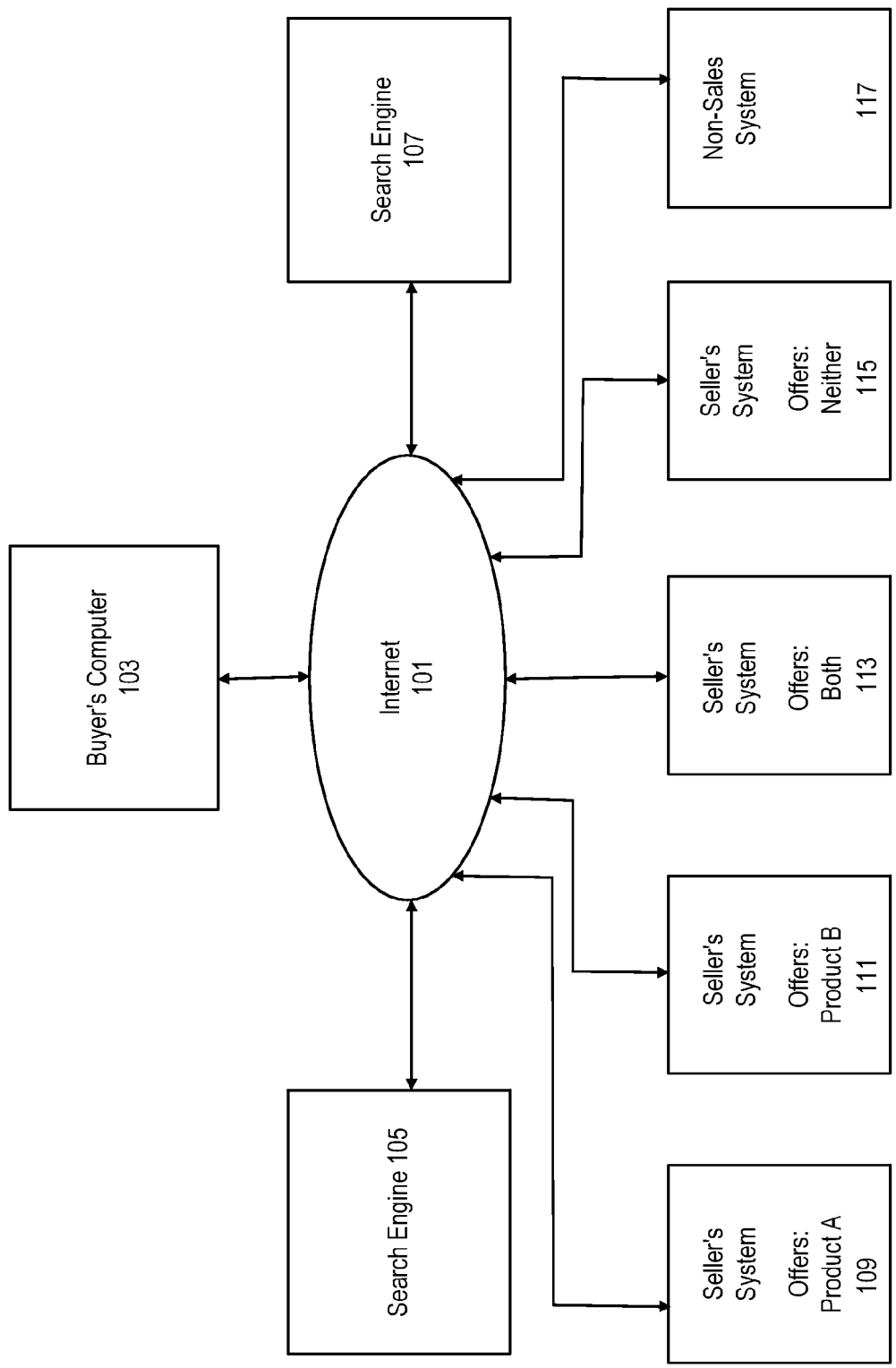
FIG. 1 is a block diagram of a Multi-Seller Interface System in accordance with the present invention.

Referring to FIG. 1, when a Buyer (i.e., individuals or business entities, such as, for example, corporations, distributers, or retailers) desires to purchase several Products (i.e., goods or services) from a plurality of Sellers (i.e., manufacturers, distributers, or retailers) via the internet 101, the Buyer typically must first, via the Buyer's computer 103, search for the Products and locate the various Sellers online using, for example, a listing site 105 and/or search engine 107. The search results may, for example, identify a Seller System 109 that only sells a desired Product A, a Seller's System 111 that only sells a desired Product B, a Seller's System 113 that sells both desired Products, a Seller's System 115 that sells neither of the desired Products and a Seller that maintains a Non-Sales System 117. The Buyer, however, does not know which System identified will support the desired purchase until the Buyer undertakes the time-consuming process of accessing and navigating each of the identified Seller's Systems. The Buyer must then find the prices for the Products and select the Seller or Sellers from which to buy the Products. Often, during the selection process, the Buyer must access and re-access selected Seller's System(s) to compare the Products and their prices.

In other words, the Buyer is faced with the problem of identifying the type and model of the Products desired, the Seller(s) that carry them, and whether those Seller(s) support online purchases. In addition, if the Buyer eventually identifies several Products that might meet the desired requirements, the Buyer has no easy way to compare the Products or their prices, regardless of whether the Buyer is looking for the Same Products (i.e., identical Products from a single manufacturer sold by multiple Sellers) or Similar Products (i.e., like Products from different manufacturers sold by multiple Sellers). Moreover, once the Product(s) and Seller(s) are finally selected, the Buyer must often undertake multiple transactions, with at least one transaction for each Seller.

The above process is further complicated by the fact that the initial step of identifying via the internet the desired Products and the Sellers who provide the Products is not inherently easy. Search engines often provide unorganized results. The Buyer is therefore required to undergo the further time consuming process of sifting through the search results just to locate possible matches.

In general, therefore, even though comparing Products and prices by conducting searches using a search engine or listing site (such as Excite or Yahoo) is possible, the process is not very productive, especially if the Buyer wants to specify an upper limit to the price the Buyer is willing to pay for one or more Products. Search query formulations on typical search engines simply do not enable a Buyer to specify upper limits for Product prices. In addition, as mentioned above, if a Buyer locates one or more Sellers, the Buyer must interact with each one individually, and often sequentially, to determine if a purchase can be made. Of course, no two sales systems picked at random are likely to be similar. Therefore, the Buyer must learn to query the sales system of each and every Seller.

To make matters more complicated, Buyers often like to receive quotes for the cost of purchasing a set of Products from different Sellers without having to consummate any purchase right away. The Buyer is usually not permitted to save such quotes at the Sellers' System, requiring the Buyer to re-request quotes every time the System is accessed. This problem is compounded when a Buyer identifies Products desired from different Sellers and views quotes for some of those Products without the ability to save any of the quotes for subsequent access and use.

Even if a Buyer prints quotes provided by multiple Sellers, if the Buyer wants to change the desired Product list and generate a new quote for the changed Product list from a particular Seller, the Buyer is often required to interact with that Seller's online Sales System to enter the information all over again. In the rare situation where a Seller allows a Buyer to save quotes for some duration, those saved quotes are likely to be discarded by the Seller after a period of suspended sales activity.

Once the Buyer finally gets to the point of actually purchasing Products via the internet, the Buyer must interact with each Seller individually, and sequentially, to provide the Buyer's shipping information and credit card related information. Usually, the Buyer is prompted to provide such information before the Buyer can consummate a purchase. If the amount quoted by an online Seller for the currently selected Products from a Buyer's list is larger than the available credit on the credit card provided by the Buyer, the sales activity is often terminated. Even when the Buyer is in possession of multiple credit cards and their combined available credit exceeds the quoted amount for a Products list, it is often not possible for the Buyer to complete the purchase due to the inability of the online Sales System of the Seller to handle such complicated transactions.

In addition to the problems discussed above, a Buyer that is also a corporation experiences its own unique set of problems when it buys in bulk from online Sellers. For example, the Buyer often must have sufficient storage capacity to house the Product purchased before the Product can be distributed. In addition, when a Buyer is purchasing and storing the Product as such, the Buyer is often paying a higher price for the Product than it would have paid if the Buyer had simply waited and bought the Product when the Buyer was ready to distribute it. This is particularly true of high technology Products, such as, for example, computers, whose prices drop rapidly as the state of the art improves. Thus, it is often desirable for a Buyer to determine the cost of purchasing just some of the desired Products in the near future as opposed to purchasing them all at a current time period. There is currently no online sales system in widespread usage that enables a Buyer to obtain graduated quotes as such. Consequently, the advantages of buying in bulk online are often vitiated.

Additionally, when a Seller sells one or more Products to a Buyer on the internet, there is often an opportunity for the Seller, or for other Sellers, to sell a related but distinct item to the Buyer that is perhaps available at another Seller's online Sales System. For example, a Buyer purchasing a computer from an online Seller may also be in the market for a computer desk and a computer chair. However, nearly all such sales opportunities go undetected and untapped because Sellers do not have the ability or motivation to automatically share sales related activity information with each other.

Further, if a Seller has built up inventory of one or more Products that it wants to dispose of at an accelerated rate, it has no means to offload such inventory online.

Small Sellers experience even more difficulty in selling Products online Before even buying Products via the internet, Buyers generally need to have confidence in the Sellers, which may not be the case unless the seller is well known or has a good reputation. Absent such confidence, Buyers may decide to pay a higher price simply for the comfort of dealing with a known Seller.

In addition, small online Sellers often do not have the Sales Systems necessary to provide online sales support. Such online Sales Systems often require web hosting services, product configuration and pricing databases, credit-card processing systems, etc. Small online Sellers often purchase web-hosting and sales support services from internet service providers or from online malls. However, Buyers can only get to such Seller's Sales System when Buyers locate and subsequently migrate to them for browsing.

Figure 2:
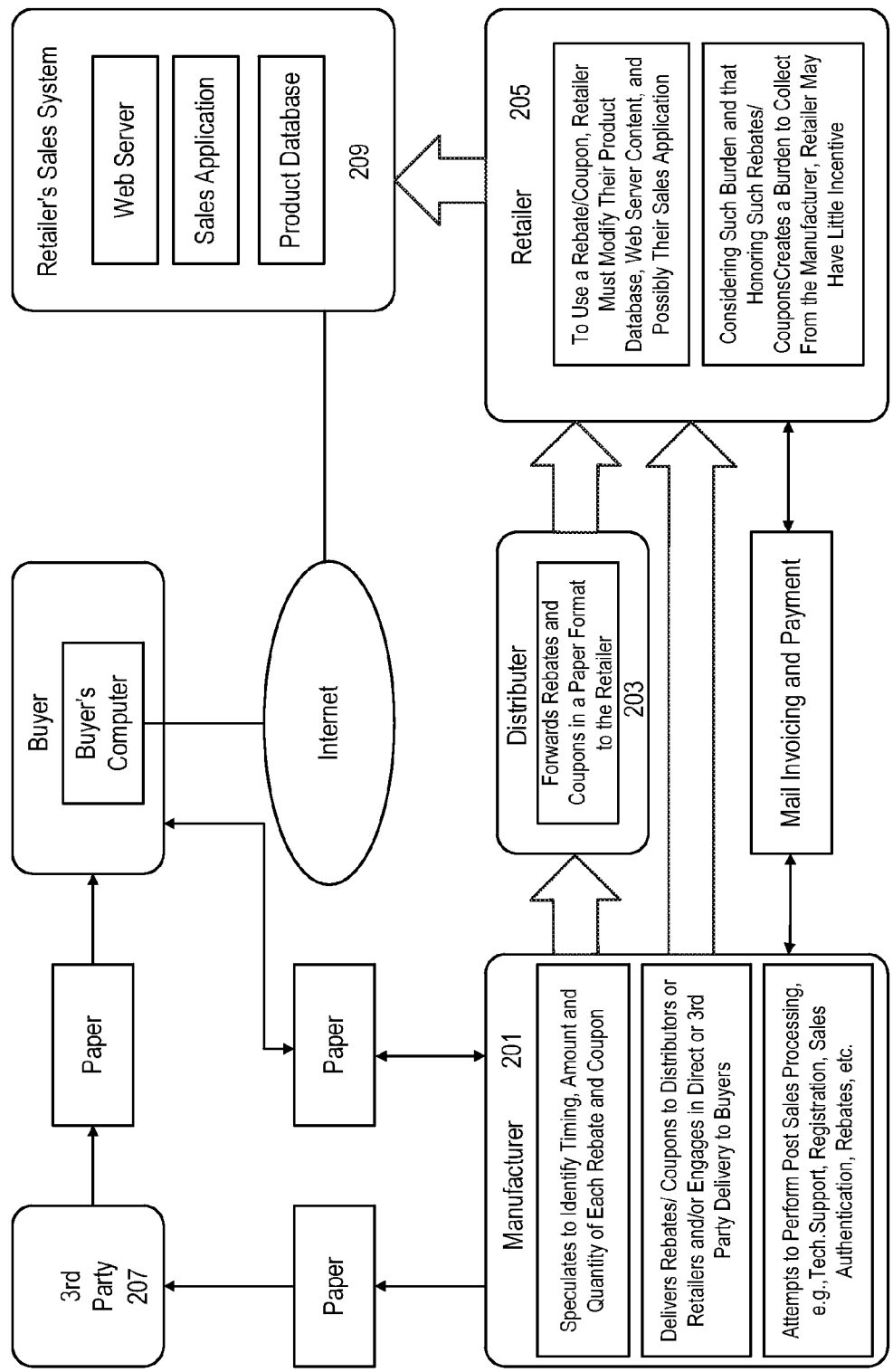
FIG. 2 is a block diagram illustrating a Multi-Seller Interface System with regard to coupons and rebates offered by a Seller in accordance with the present invention.

Sellers often provide coupons and rebates as an incentive to promote sales of specific Products. Sellers who offer coupons on the internet experience their own unique set of problems. More specifically, referring to FIG. 2, in a typical scenario, a manufacturer 201 first must speculate to identify the timing, amount and quantity of each rebate and coupon. The manufacturer 201 creates and delivers paper rebates/coupons to a distributor 203, who forwards the paper rebates/coupons to a retailer 205. The manufacturer 201 may deliver the paper rebates/coupons directly to the retailer 205. To use a rebate/coupon, the retailer 205 must modify their product database, web server content, and, possibly, their sales application. This burden, along with the burden of having to collect from the manufacturer 201, dissuades the retailer 205 from participating in the rebate/coupon process.

Alternatively, the manufacturer may use a third party 207 to deliver the coupons/rebates directly to the Buyer.

In addition, Sellers who provide coupons and rebates for Products on the internet often do not have the ability to control the amounts dispensed or to whom they are dispensed. This often leads to problems when too many, or too few, rebates/coupons, are dispensed online by a Seller. A manufacturer desires to determine the rate at which the rebates/coupons are accessed and redeemed by Buyers so as to alter the volume of rebates/coupons offered or discount given. However, rebates offered on the internet cannot be easily tracked, and without such tracking, a Seller cannot determine when to alter the rebate/coupon value or the number of rebates/coupons dispensed.

Furthermore, in most situations, retail Sellers on the internet do not have the ability or the facility to honor rebates supplied by manufacturers or distributors. This is also true for coupons. Buyers are then left with no option for redeeming such coupons and rebates. In the case of rebates, Buyers might be able to send the rebates along with the Buyer's sales receipts to manufacturers via post (snail mail) and subsequently redeem them via post.

Additionally, when Buyers are typically provided a quote by the online sales system of online Sellers for the products selected for purchase, the Buyers have the option to cancel the transactions and not purchase any Products. When they choose not to consummate a sale after a quote is provided to them, the Sellers do not have a second opportunity to provide a better quote or "sweeten the deal", causing the Seller to lose a potential sale.

After receiving the Products purchased from various Sellers, if the Buyer is interested in registering the Products with the manufacturers for technical support reasons or for Product update reasons, the Buyer must typically fill in registration cards and mail them to the manufacturers via post (snail mail). In the case of software purchased over the internet, the buyer if often prompted by the software during its installation to fill in a registration form full of questions. Such online registrations for each software purchased are a chore that Buyers often bypass at the risk of foregoing tech support from the manufacturer.

In general, without registering the product purchased, Buyers are not likely to receive warranty support or tech support. If Buyers are interested in registering the Product purchased with the manufacturer, the Buyer must mail receipts of the Products purchased, and sometimes even proofs of purchase, such as barcodes, along with registration cards, to the manufacturer. If a Buyer misplaces either the receipt or the registration card, registering the products with the manufacturers is very difficult.

When manufacturers offer rebates on specific Products, the Buyer, in general, must mail in the rebates that apply to the Products purchased. Again, mailing in rebates to manufacturers requires an investment of time and energy. For rebates being offered over the internet, Sellers must request and collect the information, print it, and mail it with receipts and sales information for redemption.

The problems related to redemption of rebates are in some ways similar to the problems with the redemption of coupons. Even if buyers can locate coupons for some of the products that they intend to buy on the internet, typically there is no easy way to redeem them on internet purchases.

Figure 3:
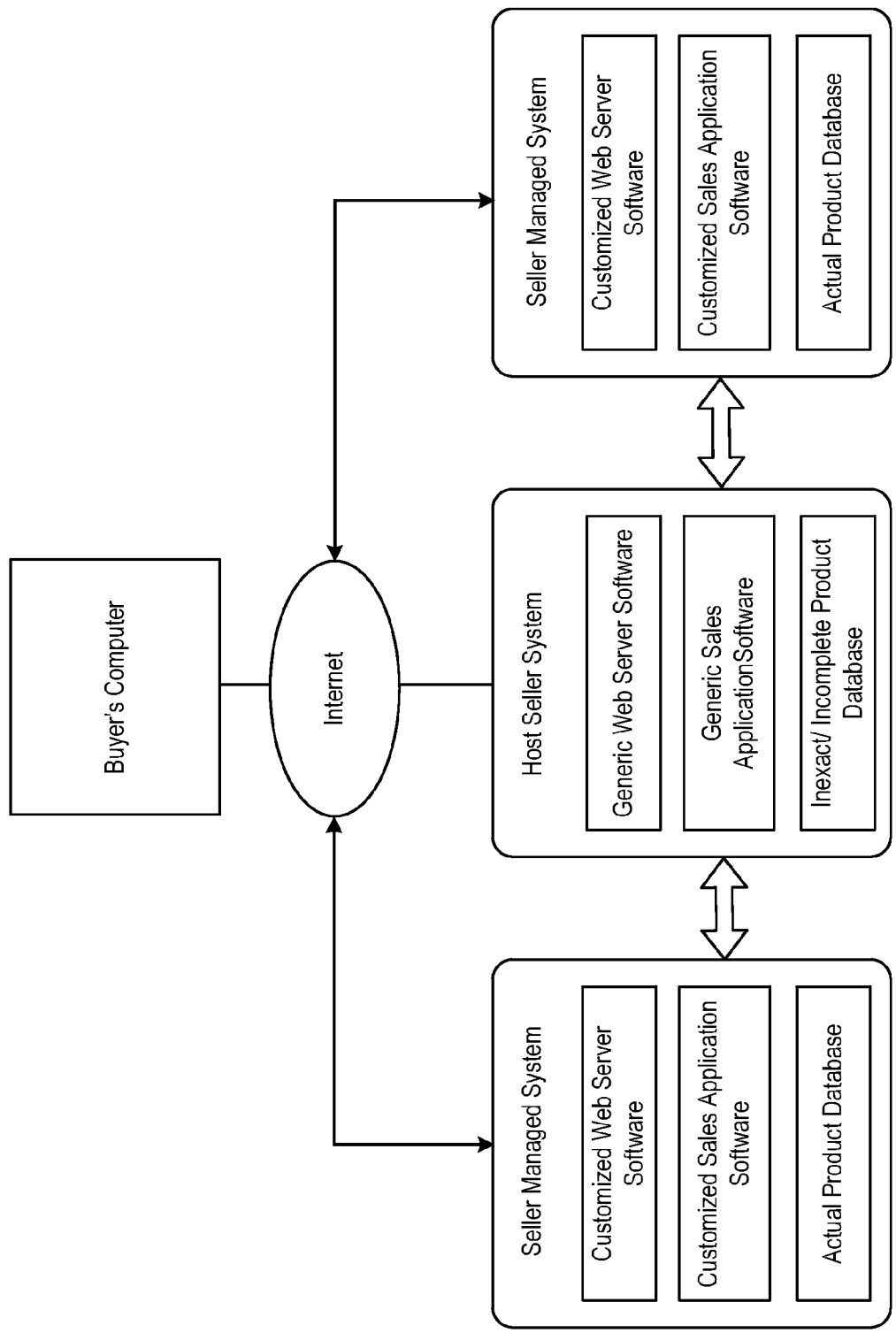
FIG. 3 is a block diagram of a Multi-Seller Interface System illustrating multiple distributors and retailers in accordance with the present invention.

Referring now to FIG. 3, quite often, manufacturers of products employ several distributors and retailers to sell their products. Often these distributors and retailers have their own internet sales presence and endeavor to sell the manufacturers products on the internet. One of the common problems faced by these distributors and retailers is their inability to assure Buyers of the availability of products, whether the product is coming from theirs or the manufacturer's inventory. This causes problems during order fulfillment activities after a Buyer makes a purchase and delay in delivery follows. Manufacturers do not have the ability to determine the sales executed by their various retailers and distributors. This causes the Seller problems in determining production targets.

Figure 4:
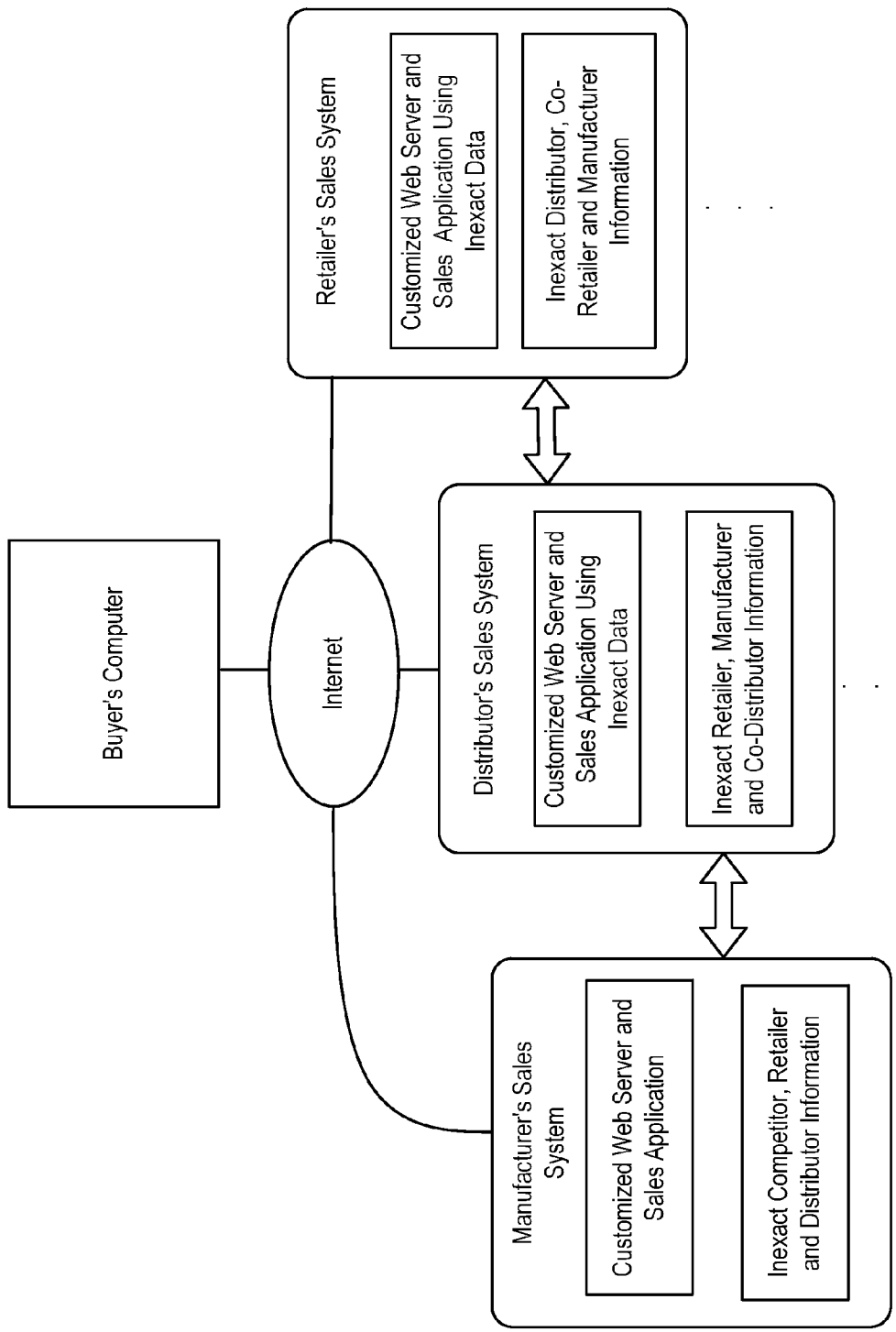
FIG. 4 is a block diagram of a Multi-Seller Interface System illustrating a Seller determining the selling price of specific Products being offered for sale by other online Sellers in accordance with the present invention.

Often, a Seller would want to determine the selling price of specific Products being offered for sale by other online Sellers (see, e.g. FIG. 4). This, however, is not easy. Such information may be gathered by visiting the online sales sites of various vendors and browsing or executing queries on each of those sales sites to extract pricing information. This solution does not scale up.

If manufacturers want to control the flow of rebates in an automated way, they require information, such as the volume of sales, from their distributors and retailers. In the online internet based sales environment, coupons and rebates dispensed to Buyers cannot be easily tracked and reported, especially if the individual distributors and retailers have online sales systems that don't interact with each other and don't communicate information easily, as is the situation when they all have heterogeneous sales environments. A related problem is one of determining the sale prices for similar products from different retailers and distributors that sell the same family of products from a manufacturer.

Quite often, third party web-hosting companies host online sales systems for multiple vendors, some of whom might be involved in selling Similar or Same Products (see e.g., FIG. 3), If online vendors have to determine prices of similar Products or the same Products sold by their competition, it is often difficult to obtain such information in a timely manner even when the competing vendors are hosted by the same web-hosting service provider. Among other reasons for this, one important reason is the fact that each vendor employs their own proprietary tools and system design to store product information, customer information, sales information etc.

If a product manufacturer, their distributors and retailers each manage their own online sales system, then it is difficult for them to correlate similar or the same information contained in each of their systems. If they choose to install and use similar sales systems to alleviate this problem, then the distributors and retailers are either constrained to carrying products from that single manufacturer or they are forced to support several such manufacturer specific proprietary sales systems. Therefore, in order to minimize the number of such sales systems that they have to support and interact with and yet not limit themselves to a few manufacturers, distributors and retailers are often forced to maintain their own individual and customized sales system that is not necessarily tied to any individual manufacturer. By doing so, they encounter the problems of correlation of data in their sales systems and in those of the manufacturers.

Figure 5:
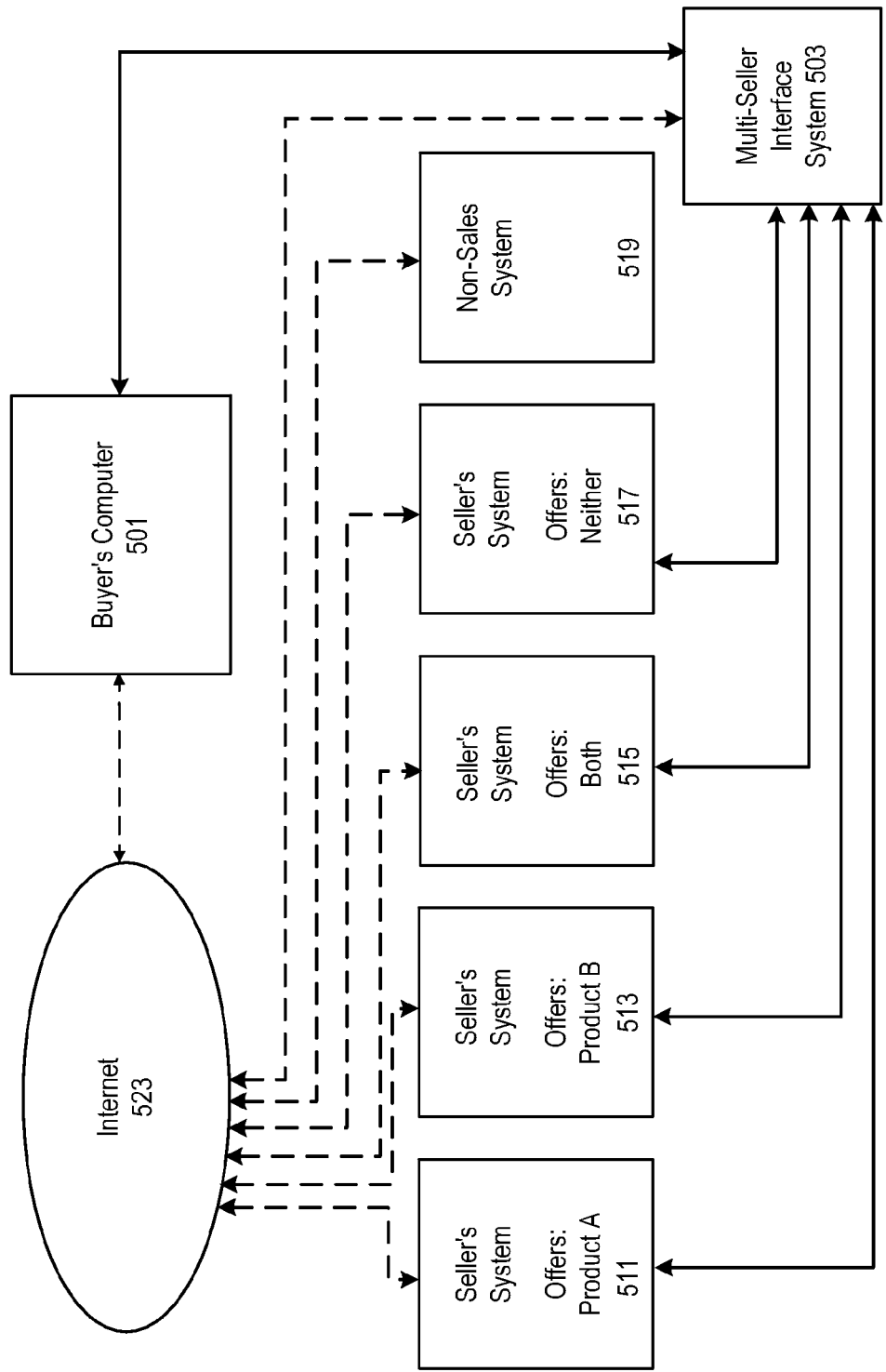
FIG. 5 is a block diagram illustrating the Multi-Seller Interface System's role in the identification of Sellers for a Buyer attempting to purchase products Product A and Product B over the internet in the present invention.

FIG. 5 is a block diagram showing the Multi-Seller Interface System's 503 role in the identification of Seller's for a Buyer attempting to purchase products Product A and Product B over the internet. The Buyer, using the Buyer's computer 501, interacts with the Multi-Seller Interface System 503 to specify information about the products Product A and Product B that he intends to purchase from online Sellers on the internet. The Multi-Seller Interface System 503 identifies the various Seller's systems based on the category of products the Sellers carry, the Seller's capability to provide quality goods and services, and other criteria. For example, the Multi-Seller Interface System's (MSIS) 503 identifies Seller's systems 511, 513, 515 as those that are capable of selling one or more products desired by the Buyer. It also determines that the Seller's System 517 is incapable of selling one or more products desired by the Buyer and that the Non-Sales System 519 should be ignored for possible sales transactions initiated by the Buyer.

The Buyer's computer 501 interacts with the MSIS 503 via internet 523. Similarly, the MSIS 503 interacts with the Seller's systems 511, 513, 515, 517 and 519 via internet 523.

Optionally, the MSIS 503 may choose to interact with any of the Seller's systems 511, 513, 515, 517 and 519 via a dedicated network or via an intranet.

Typically, in response to a Buyer's selection of product categories, the MSIS 503 sends queries to one or more Seller's systems 511, 513, 515, 517, 519 to extract product and pricing information from the corresponding Seller's system. In response, the Seller's systems typically return shopping carts filled with those Buyer specified products that they are capable of selling, along with prices for the products and, optionally, their inventory of the products.

Figure 6:
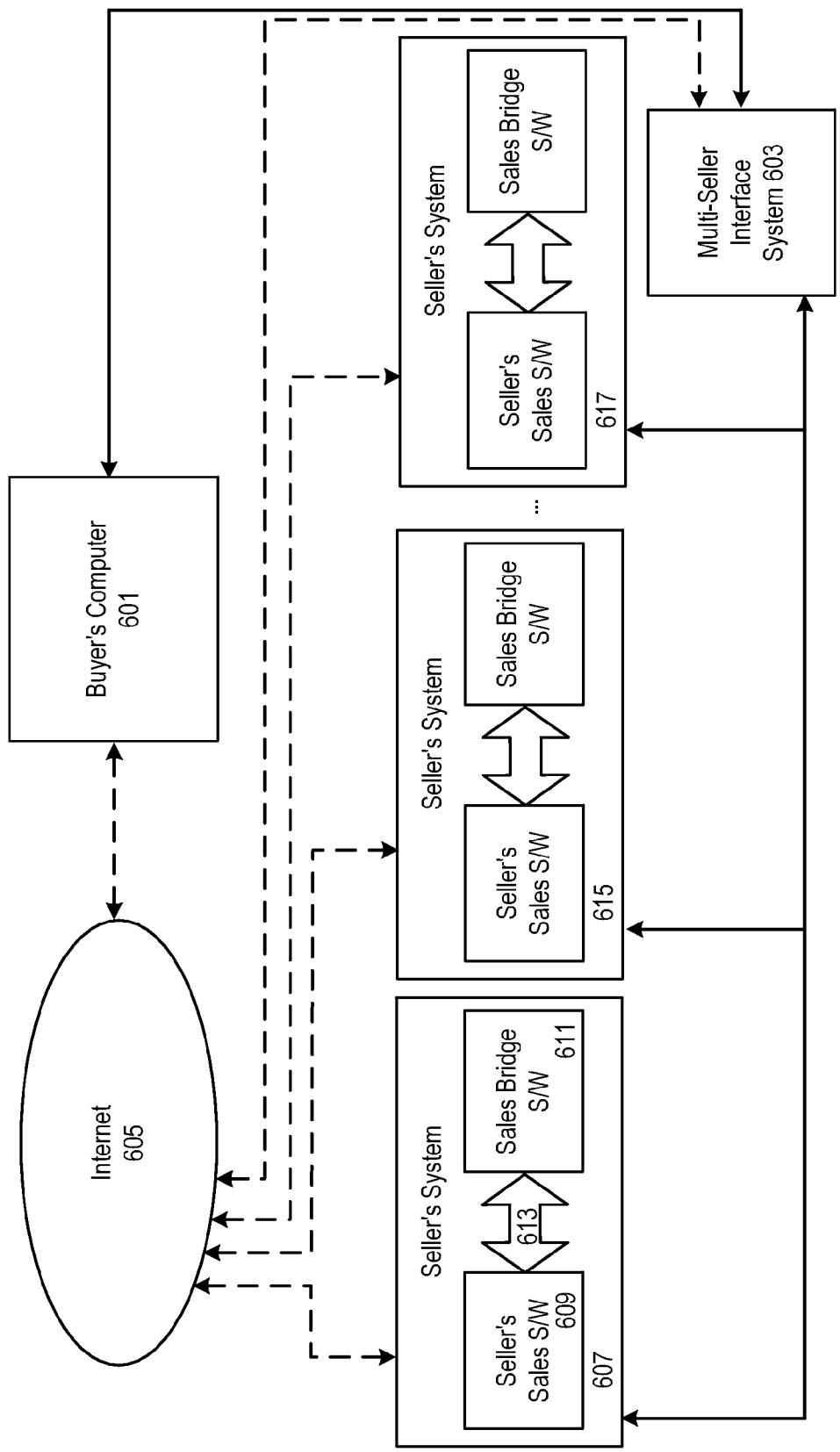
FIG. 6 is a block diagram illustrating the Multi-Seller Interface System capable of interacting with Seller's systems employing a Sales Bridge software that is installed on each of the Seller's systems in the present invention.

FIG. 6 is a block diagram showing the Multi-Seller Interface System's 603 capable of interacting with Seller's systems 607, 615, 617 employing a Sales Bridge software 611 that is installed on each of the Seller's systems 607, 615, 617. The Sales Bridge software 611 is used by the MSIS 603 to execute queries sent to the Seller's systems 609, 615, 617 from the MSIS 603 and, in response, return shopping carts with prices back to the MSIS 603. In general, the Sales Bridge 611 is used by the MSIS 603 as a remote database layer that is capable of translating queries received from the MSIS 603 into queries and processes that retrieve the requested information, such as configuration, pricing and inventory, from the Seller's Sales software 609.

A Buyer using a Buyer's computer 601 interacts with the MSIS 603 over internet 605 to specify queries related to products that he intends to purchase. Such interactions typically involve navigating down a hierarchy of product categories to identify those that the Buyer is interested in, or specifying a search criteria via a search interface to extract information on products and product categories and to identify relevant product categories.

Figure 7:
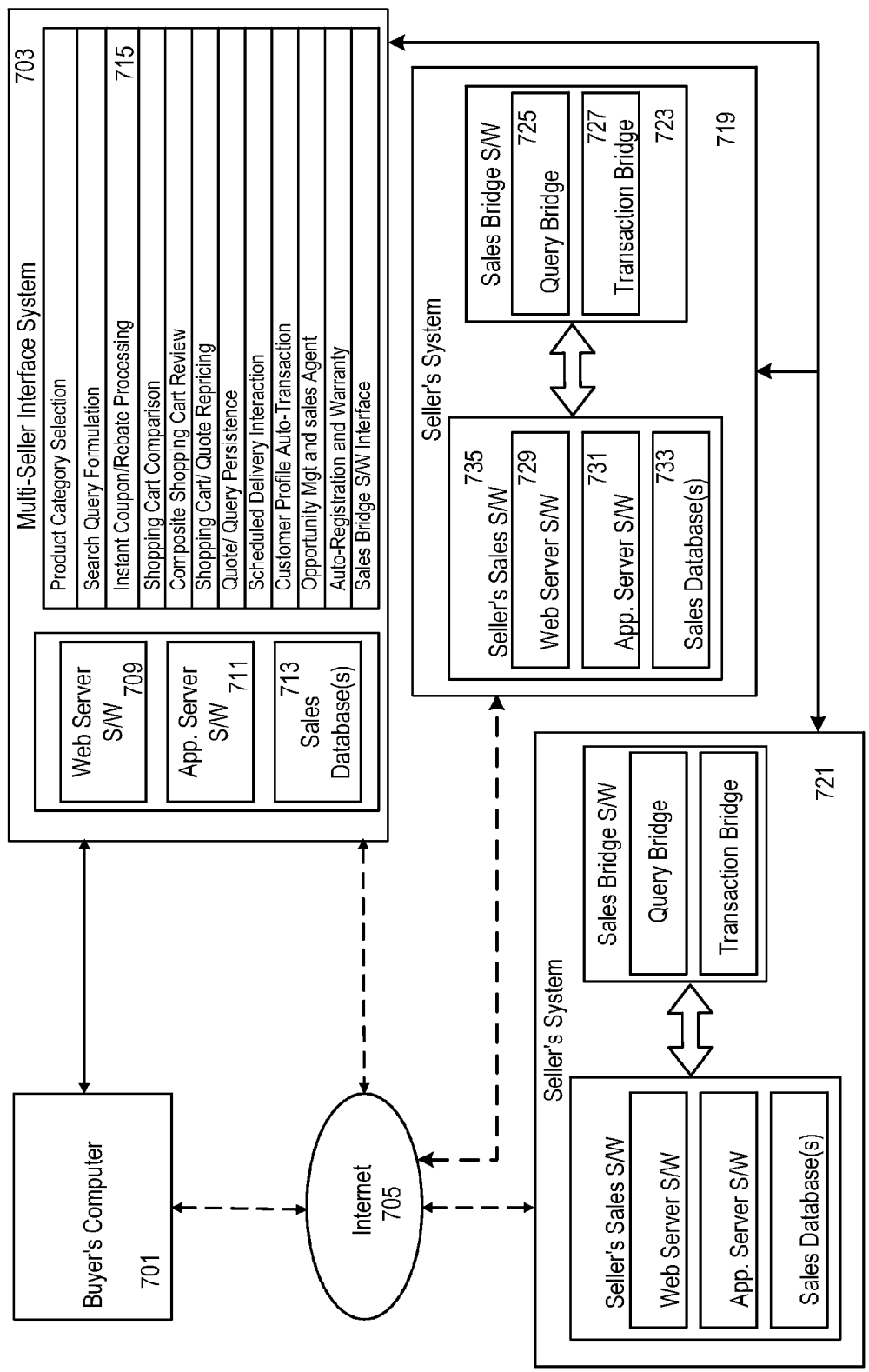
FIG. 7 is a schematic block diagram illustrating various functionality of a Multi-Seller Interface System's and Seller's systems of the present invention.

FIG. 7 is a schematic block diagram illustrating various functionality of a Multi-Seller Interface System's 703 and Seller's systems 719 and 721. The MSIS 703 includes one or more web server software 709 with which Buyer's computers 701 interact, one or more Application server software 711 that provide various Sales services to buyers accessing them over internet 705 and one or more Sales databases 713 that is used to save various kinds of information such as customer profile, saved quotes, product categories, etc.

Among other things, the MSIS also supports product category selection, search query formulation, instant coupon and rebate processing, shopping cart comparison, composite shopping cart review, shopping cart pricing and saved quote repricing, quote persistence and query persistence, scheduled delivery information from Buyers, customer profile auto transactions, opportunity management and sales agent support, automatic registration of products on behalf of Buyers, Warranty management. In addition, it also includes Sales Bridge software interface that makes it possible to interact with Seller's systems 719 and 721.

Seller's systems 719 comprises a Seller's sales software 735 and a Sales Bridge software 723. The Seller's Sales software 735 includes a web server software 729, an Application server software 731 and a Sales databases 733. The Sales Bridge software 723 comprises a Query Bridge 725 and a Transaction Bridge 727.

The Query Bridge 725 is used to query one or more Sales databases 733 using queries formulated by the MSIS 703 or queries created from search information sent by the MSIS 703. Information extracted by the Query Bridge 725 is communicated to the MSIS 703 over communication links 737. The Transaction Bridge 727 is typically employed by the MSIS 703 to conduct credit-card based sales transactions with the Seller's system 719.

Figure 8:
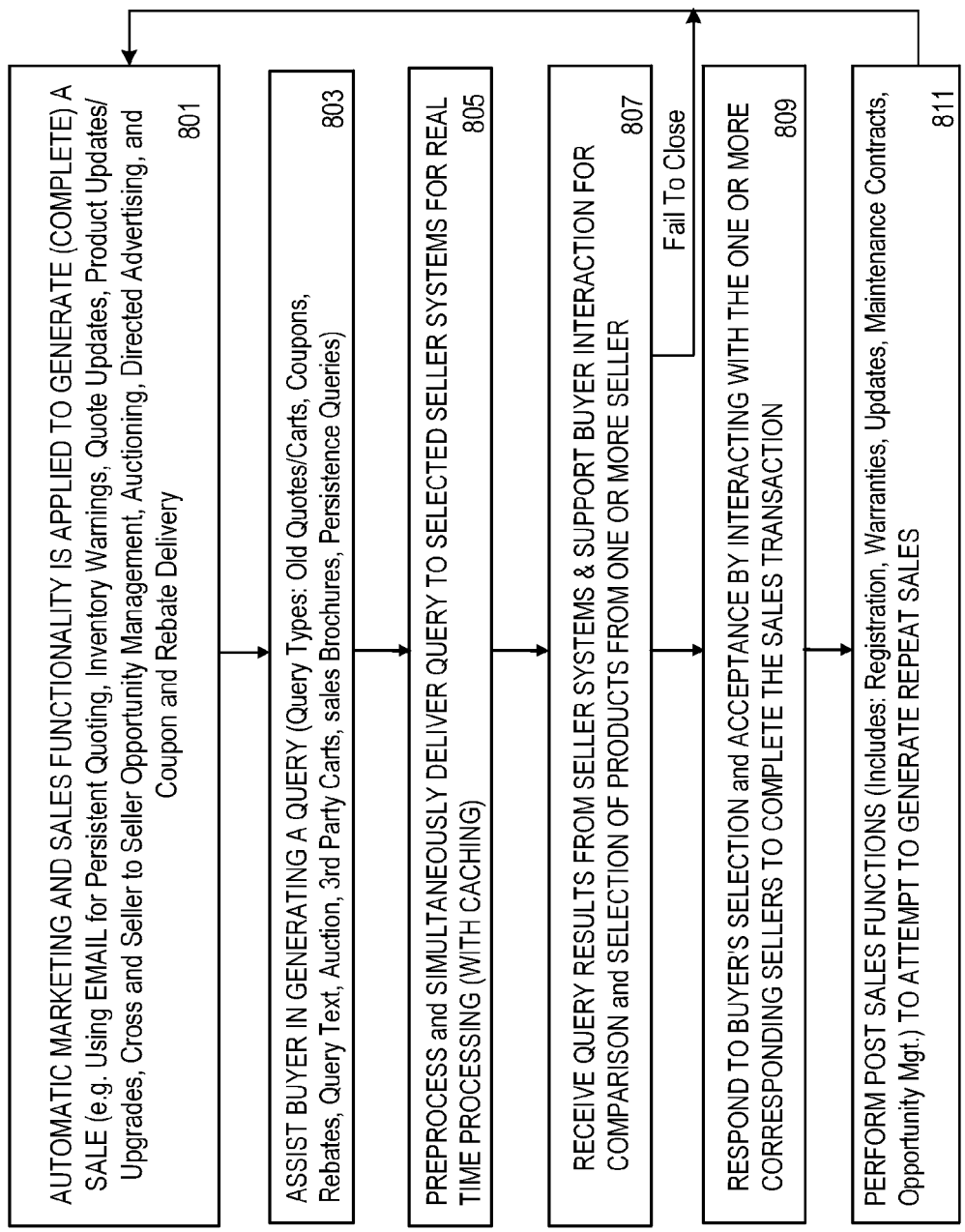
FIG. 8 is an exemplary flowchart illustrating typical workflow at the Multi-Seller Interface System of the present invention.

FIG. 8 is an exemplary flow chart showing typical work flow at the Multi-Seller Interface System's 703. At a block 801, the MSIS 703 attempts to generate a sale employing automatic marketing and sales functionality. These activities include emailing potential buyers information such as saved persistent quotes, current inventory information, quote updates based on repricing existing quotes, product upgrades that might have become available, up and cross-selling opportunity detection from an individual Seller's sales activity or from monitoring sales activities across multiple Sellers. The automatic marketing and sales functionality activities also include directed advertising, coupon and rebate delivery to potential Buyers based on Buyer profile provided by Buyers or based on information gathered by tracking Buyer's buying habits.

Later, at a block 803, the MSIS 703 assists Buyers in generating a query for subsequent submission of those queries to Seller's systems. Queries can take the form of old saved quotes or shopping carts, coupons selected, rebates selected, query text, third party shopping carts, sales brochures, persistent queries, etc.

Later, at a block 805, the MSIS 703 preprocesses Buyer specified queries and delivers them to selected Seller systems that are identified based on one or more search criteria including, in some cases, product categories, customer profiles, etc. Some of these queries are selectively cached in memory by the MSIS 703.

When the Seller's systems respond with product and pricing information, for example, with priced shopping carts that include all or a subset of the Buyer's product list, the MSIS 703 presents the information to Buyer for interaction with the Buyer. Optionally, such information is presented as a comparison of products and prices. If a customer's query fails to retrieve results from Seller's systems, the MSIS 703 makes a transition to the block 801.

Otherwise, the MSIS 703 continues to a block 809 where it responds to Buyer's selection and acceptance of product prices by interacting with none or more corresponding Seller's systems to complete the sales transactions. Subsequently, at a block 811, the MSIS 703 performs post sales functions which selectively includes registration, warranties, updates, maintenance contracts, opportunity management etc. Opportunity management is employed to generate additional sales or repeat sales.

Figure 9:
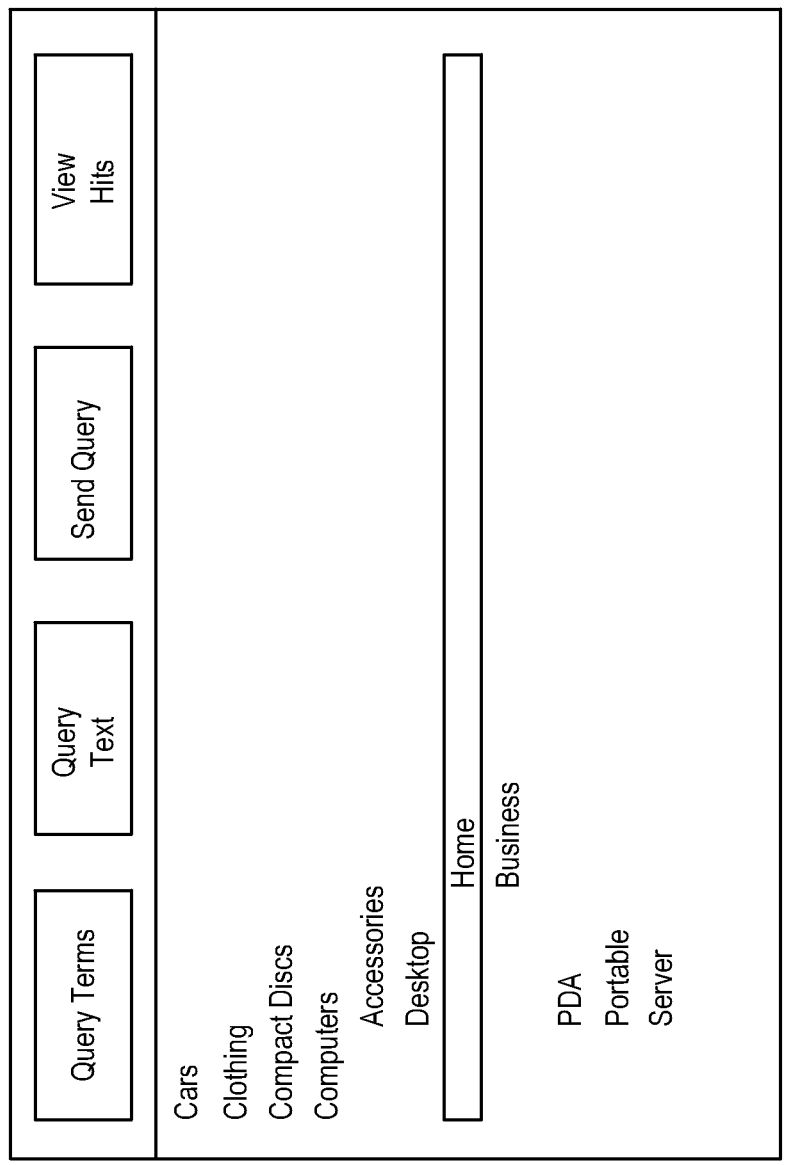
FIG. 9 is an exemplary screen layout that a Buyer interacts with in order to select products and obtain product prices during an online purchasing activity supported by the MSIS in the present invention.

FIG. 9 is an exemplary screen layout that a Buyer interacts with in order to select products and obtain product prices during an online purchasing activity supported by the MSIS 703. The MSIS presents a Buyer with a screen of information that includes a button for Query terms that the Buyer can select from, a button for Query Text that is optionally entered by the user to facilitate product and price searches, a button that when activated, results in sending a query to one or more Seller's systems, and a button that makes it possible to view the hits following the receipt of responses to Buyer's queries.

FIG. 10 is a diagram that shows a list of products with prices provided to Buyer by the MSIS 703. It shows a comparison of prices, for products acquired from two different shopping carts. In this exemplary scenario, products bought from two different Sellers add up to a total that is less than the total quoted by another single Seller. Addition, the Sellers are rated, with asterisks (**) indicating the ratings.

Figure 11:
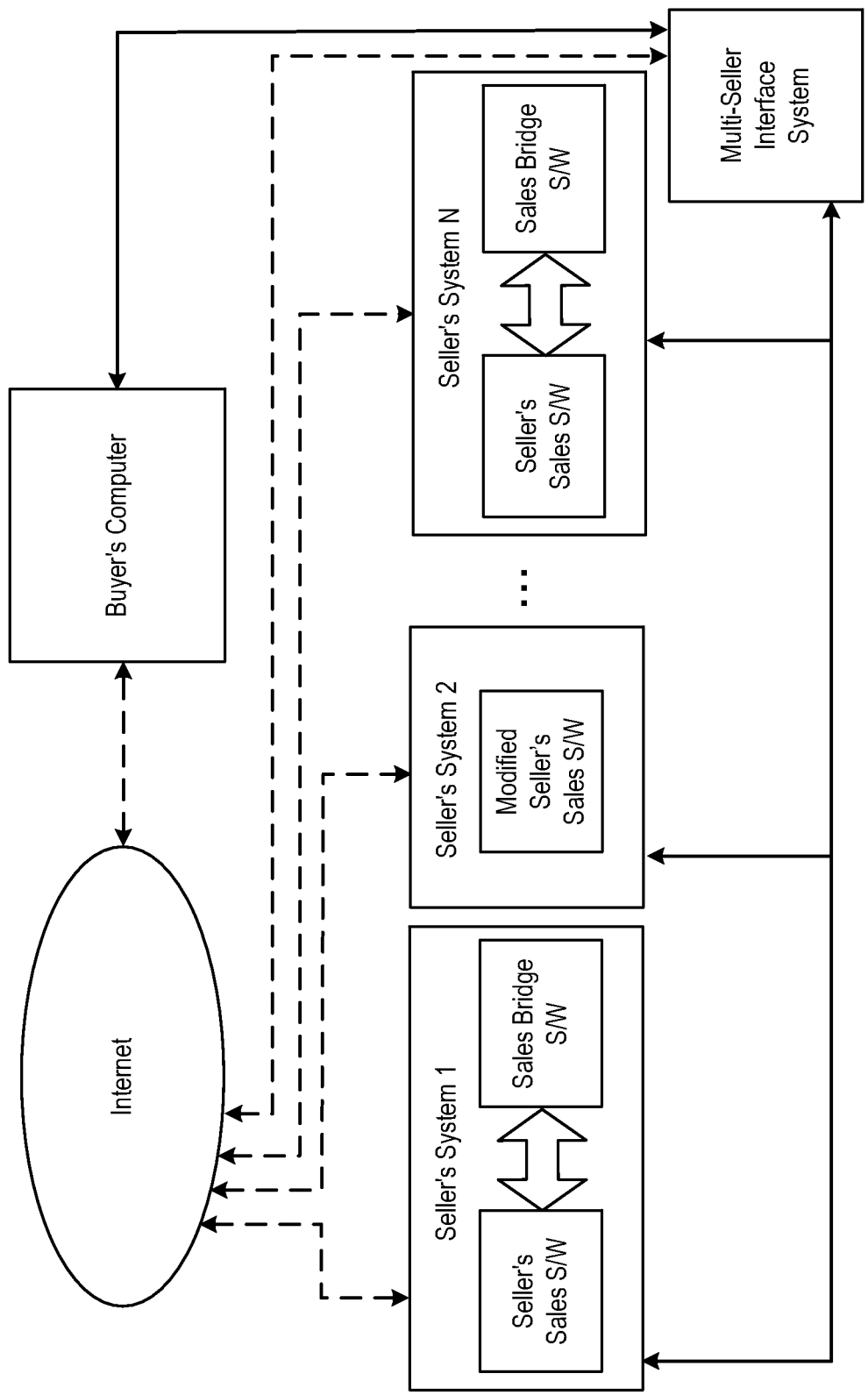
FIG. 11 is a functional block diagram of buyer and seller system interaction with the system of the present invention.

FIG. 11 provides a functional block diagram of buyer and seller system interaction with the system of the present invention. Therein, the system comprises a web based, Multi-Seller Interface System (MSIS) and a plurality of Sales Bridge Software (SBS) modules through which buyer's computers can simultaneously access many independent and differing sellers' sales systems.

To interact with the system of the present invention, a buyer, corporate or individual, merely accesses web pages provided by the MSIS with conventional web browser software on the buyer's computer. The buyer interacts with the MSIS to define queries relating to one or more desired products. The MSIS automatically attempts to identify those of the plurality of participating sellers that might carry such products. Once defined, each query is simultaneously communicated by the MSIS to each of Seller's Sales System (SSS) via the SBS modules of the identified ones of the plurality of participating sellers. Using a query bridging approach, each SBS module performs a search of product, pricing, inventory, etc., database(s) based on the query. All sales information relating to each product identified in the search is delivered to the MSIS for the buyer's review, comparison and selection. The MSIS permits concurrent selection and single transaction purchasing of products from more than one seller. Caching of common queries on a day to day basis is also supported by the MSIS to minimize communication overhead.

The sales information returned from each SSS represents complete, real time public and private sales information, catering not only to individual buyers, but, more importantly, to sellers. For example, in response to queries from individual buyers or competitors, the query bridge of the present invention may easily be configured to deliver public information such as pricing and product descriptions. For queries generated within a selling channel (i.e., by a manufacturer, distributor or retailer or by their sales systems), private information relating to each product such as inventory, inventory projections, numbers sold, margins, etc., may be easily and automatically exchanged. Such information can be used for forecasting inventory, pricing, planning promotional activities (e.g., instant coupons, auctioning and rebate programs), and production planning, for example.

The MSIS supports query definition in several ways to provide the buyer with greatly needed yet currently unavailable functionality. For example, through a category selection process and/or textual search term entry, a buyer can construct a query to simultaneously retrieve from all sellers all underlying product sales information matching the query. The buyer can also generate a query from online rebate and coupon information for true instant processing, unlike current online rebate and coupon vendors who incorrectly claim to do the same. Queries may be generated from third party seller shopping carts for comparison with participating sellers' products. Saved quotes may be converted to queries for updating and verification, and may be used as a persistent basis via sales email for attempting to complete the transaction with the buyer. Further, queries may be generated from advertising information, e.g., online auction descriptions, online sales brochures, etc., whether or not such information originates within the MSIS.

Selling channel systems also generate queries in a number of, ways with or without interaction through a web client (user interface). Automatic data gathering between participants in the selling channel will permit an application (based on a toolkit) to automatically (1) place or suggest placing orders to replenish inventory, (2) identify new product offerings, (3) suggest pricing changes, (4) facilitate just in time delivery, (5) identify and/or maintain appropriate inventory levels, (6) suggest or carry out changes or additions to advertising and promotional programs, (7) schedule release of upgraded or superseding products, etc. Competing selling channel systems may also be queried (automatically or otherwise) to gather public information regarding competing product lines. Such information may be used to supplement the automatic processes identified in items 1-7 above, for example. A toolkit underlying the MSIS simplifies preparation of application software to carry out such and other processes. Such application software may run on any or all system(s) within a sales channel. In fact, such application software, or portions thereof, may be placed at many locations within a single organization to carry out internal, enterprise sales functions.

The toolkit underlying the MSIS also provides for up, cross and seller to seller opportunity management for automated, email-based target marketing without the need to release buyer information to a participating seller. For example, the MSIS permits a first seller to establish relationships between completed and/or queried sales transactions within categories and/or by a specified second seller. Based thereon, predefined email is automatically sent to buyers or potential buyers advertising sales of the first seller's products that relate to the category or to the second seller's product.

From a buyer's online perspective, the MSIS performs a single transaction (e.g., credit card) processing of multiple product selections spanning more than one seller. Based on final configuration, the underlying transaction may actually involve (1) a plurality of transaction processes between each seller and the buyer using the buyer's credit card information, and/or (2) a single credit card transaction for the total from the buyer to the MSIS along with a plurality of transaction processes with each seller involving account information of the MSIS.

As part of the sales transaction, or in follow up thereto, the MSIS performs automated registration, warranty delivery and acceptance, maintenance contract offerings and purchases, and emailed product information regarding updates and upgrades services. Stored buyer profiles minimize buyer interaction required to carry out sales transactions and such associated services. Stored buyer transaction records enable targeted email advertising, persistent query support, opportunity management, etc.

The MSIS can, upon a seller's request and in addition to or in replacement of the seller's sales system, perform transaction and/or other sales processing for the seller. In addition, the MSIS provides each seller with real time access to product sales information from the seller's competitors and own sales chain. The query protocol and the SBS enable a corporate buyer to develop specifically desired sales interfaces into one or more seller systems. The underlying functionality and software libraries used in the MSIS may be specifically licensed for such purpose. Corporate buyers are also supported through scheduled purchasing and just in time delivery functionality within the MSIS.

The present invention may generate revenue by taking a percentage of each completed sales transaction conducted through the MSIS. To generate further revenue, the MSIS tracks each buyer's use of the web-site, whether or not a transaction is completed, and offers to provide sellers with information for potential future sales opportunities. Similarly, the System offers instant rebate and coupon processing, direct email targeted sales, advertising space, and persistence in exchange for transaction percentages. Credit card processing, delivery tracking, customer support, and other backend sales functions can be offered, generating further revenue streams.

The System may be based on web server and application server software products offered by Trilogy Development Group, a company located in Austin, Tex.

Figure 12:
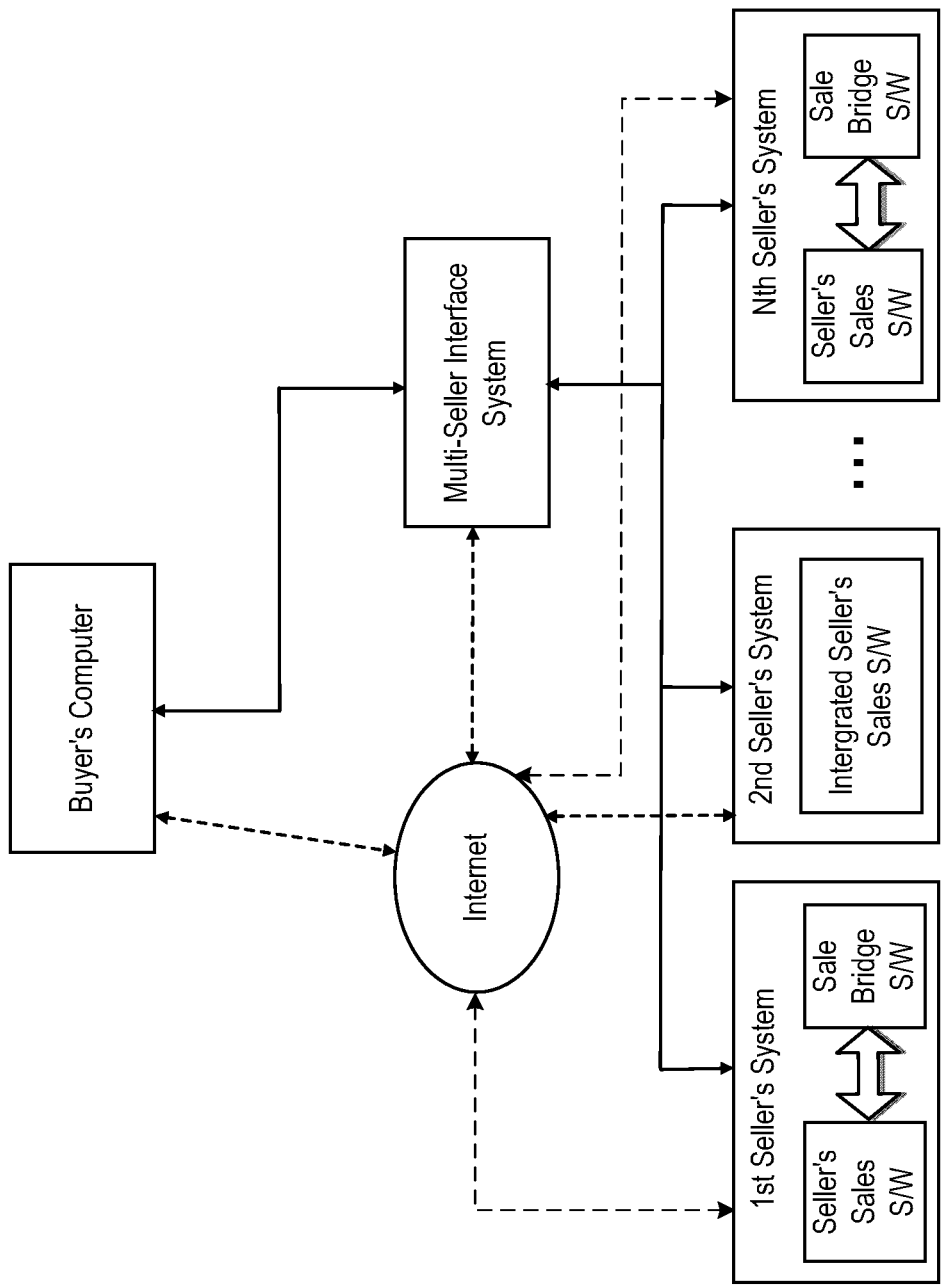
FIG. 12 is a functional block diagram of buyer and seller system interaction with the Multi-Seller Interface System (MSIS) of the present invention.

FIG. 12 provides a functional block diagram of buyer and seller system interaction with the Multi-Seller Interface System (MSIS) of the present invention. The MSIS comprises SalePoint and SaleBridge Software. The SalePoint software runs on one or more conventional web and application servers to provide a multi-seller interface.

The SaleBridge software is placed on each seller's online sales system to bridge communication between the SalePoint software and each seller's online sales databases and applications. Buyers may then simultaneously access many independent and different seller's sales systems. Similarly, groups of sellers (within one or more sales channels) can easily and automatically share sales and product information.

Figure 13:
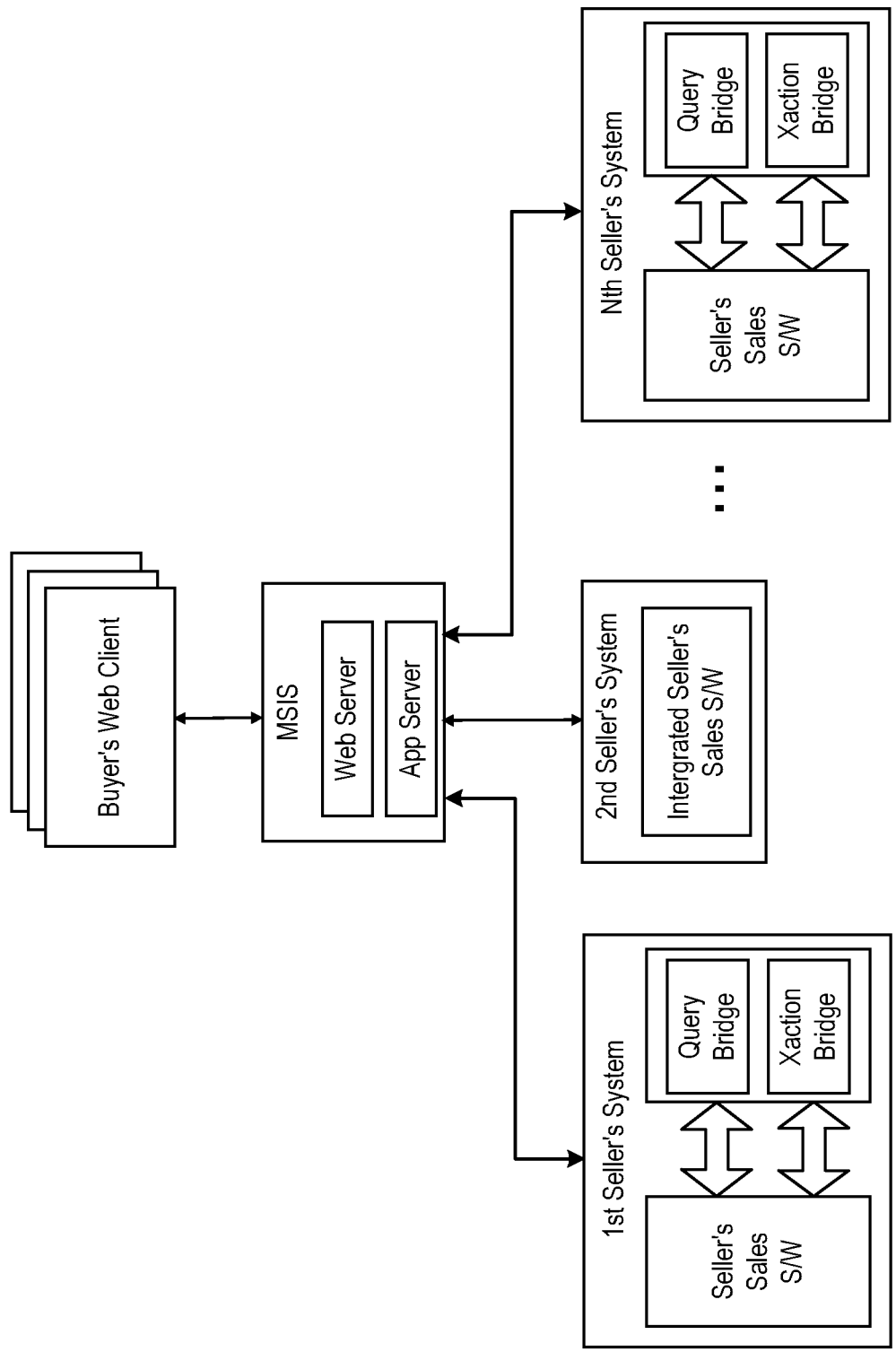
FIG. 13 is a diagram illustrating the SalePoint software supporting web based, interactive access by buyers and sellers through their web clients, and non-web based, automatic access by the sellers through an interface of the present invention.

As shown in FIG. 13, the SalePoint software will support web based, interactive access by buyers and sellers through their web clients, and non-web based, automatic access by the sellers through an interface.

The SaleBridge software uses both query and transaction bridging functionality to couple each seller's system with the SalePoint software. Alternatively, such bridging functionality may be partially or entirely integrated into the seller's system.

Figure 14:
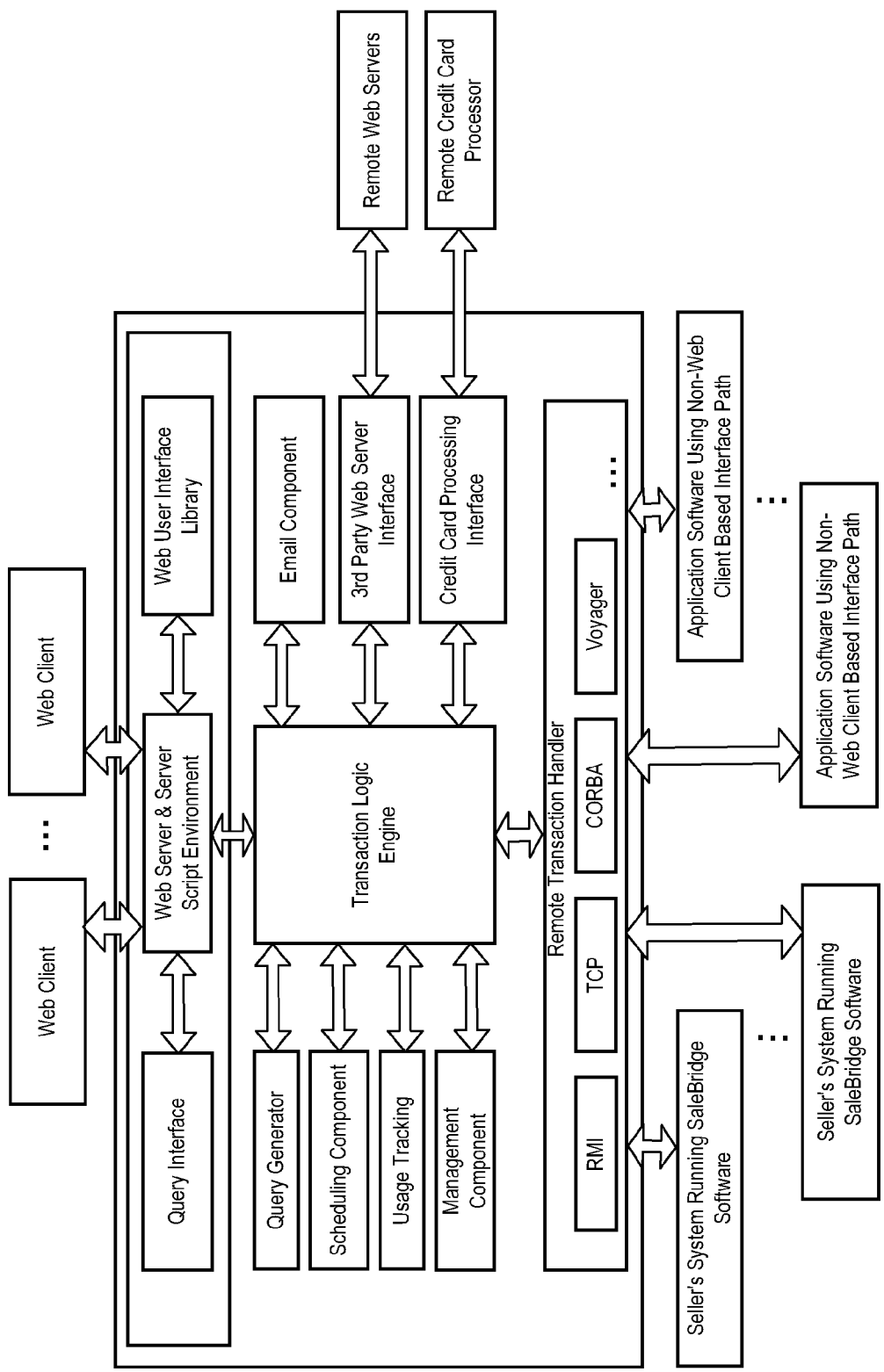
FIG. 14 is a diagram illustrating buyers using their web client software to select and request server pages for one of a plurality of application services in the present invention.
Figure 15:
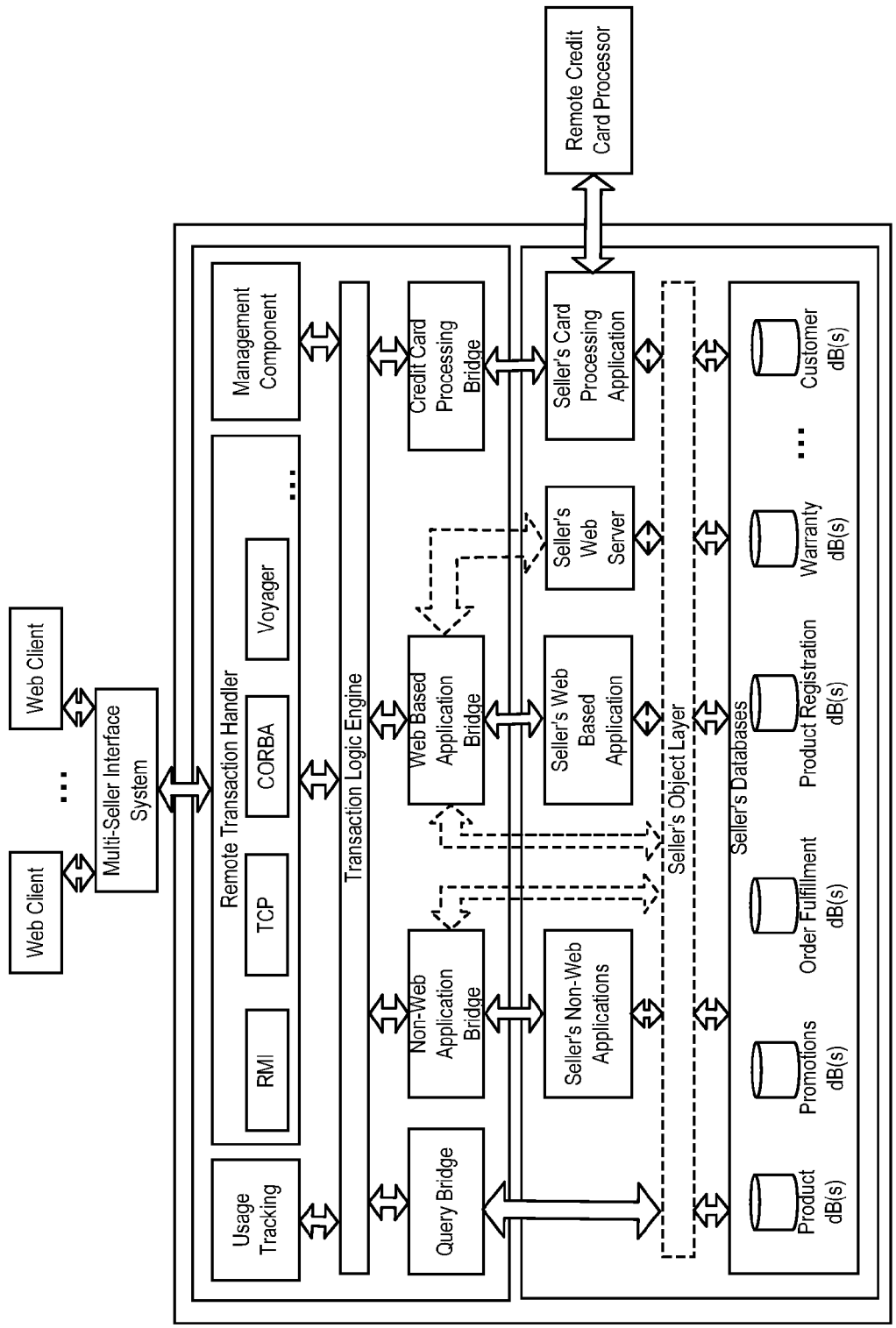
FIG. 15 is a diagram illustrating the interactions between the software and the Seller's system of the present invention.

FIGS. 14 and 15 are detailed drawings of the SalePoint and SaleBridge software. As shown in FIG. 14, buyers use their web client software (e.g., a browser) to select and request server pages for one of a plurality of application services. A web server and server script environment responds by serving html files, server pages and images that correspond to the selected application service. The server pages executed by the environment typically incorporate method invocations on objects stored in an object layer or object backbone and associated databases. In addition, the server pages identify transaction logic for the selected application service.

For each of the application services, transaction logic (a high level scripting language) is written to include a sequence of tasks that each manipulate data or objects, with each of the tasks executed by underlying task specific transaction logic or compiled code (hereinafter a "workflow object"), or both. Although transaction logic is specifically written for each of the application services, many of the workflow objects and underlying task specific transaction logic are shared by different application services.

Some examples of the application services contemplated by the present invention can be found with reference to FIGS. 16-22 below. The tasks executed by the transaction logic engine may include, for example, credit card related transactions, database searches, database updates, remote transactions executed on one or more seller's systems, etc.

The transaction logic engine interacts with several other web server components of the SalePoint Software, such as a query generator, scheduling component, usage tracking, management component, email component, 3rd party web server interface, credit card processing interface and a remote transaction handler. The query generator creates queries based on information provided by buyer, data retrieved from database(s), information provided via method invocations from non-web server interface, etc. The queries generated by the query generator are selectively sent to SaleBridge software associated with remote Seller's systems to extract various kinds of sales information.

The scheduling component is used to periodically initiate various tasks, transaction logic, and activities such as reporting or re-pricing, etc. For example, a buyer or seller can schedule various activities and specify when and how frequently they should be executed through associated application services. The schedules and the activities are saved in databases by the scheduling component for subsequent retrieval and execution by the transaction logic engine.

Although usage tracking might have been implemented via transaction logic, it is implemented as a separate component to collect, process and report information regarding the use of the SalePoint Software by buyers and sellers. The usage tracking component provides information on products sold by various sellers, product sales volume, type of products being sold, inventory information, and various other sales related information. The usage tracking component provides information with different levels of granularity, as required and authorized by various buyers and sellers.

The management component is used to manage various activities, scheduled or unscheduled, for buyers and sellers. It is also used to manage initializations, application service deployment, updates, recycling, and shutdown of various resources.

The email component is used to send email to one or more buyers or buyer groups after the processing of certain events or after the execution of a scheduled or unscheduled transaction logic command. It is also used to send various information, such as, for example, buyer purchasing and query profiles, to sellers and to email promotional material such as coupons and rebates to one or more buyers.

The 3rd party web server interface is used to interact with remote web servers to retrieve or to provide various kinds of information. Using this interface, it is possible to interact with remote web servers just like web clients on those web servers.

The credit card processing component is used to interact or conduct transactions with remote credit card processing units. Such remote credit card processing units may be located at seller's environments or incorporated into a seller's system. The credit card processing component enables a buyer to selectively spread purchases over one or more credit cards owned by the buyer, and to spread a buyer's shopping cart purchase over several sellers.

The remote transaction handler provides support for interactions with SaleBridge Software installed with one or more remote seller's sales systems. It employs one or more communication mechanisms such as Remote Method Invocation (RMI), Common Object Request Broker Architecture (CORBA), TCPIIP, Voyager, etc., to communicate with remote software and retrieve information. Remote SaleBridge Software can initiate communications with the SalePoint Software in order to retrieve information, provide information, or request some service. It also supports communication with external systems such as third party credit-card systems and monitoring tools.

FIG. 15 shows the interactions between the SaleBridge software and the Seller's system. The seller's system may have its own web server to provide an interface to web clients. The seller's system also typically incorporates seller's database that comprise, among other things, product, promotional, order fulfillment, product registration, warranty and customer databases. An object layer on top of the database layer enables the application layer to manipulate objects.

The seller's system may also contain the seller's non-web applications, web based applications, and card processing application. The SaleBridge Software may also interact with the seller's applications to extract product, pricing and inventory information as well as to conduct credit-card based transactions.

If the seller's system includes a web server, the SaleBridge Software may also provide a web based application bridge to assist the query bridge in extracting product, pricing and inventory information. The query bridge is responsible for mapping or translating queries sent by SalePoint Software into one or more queries executable on the seller's databases to retrieve, and possibly update, information in the seller's databases.

The SaleBridge Software also provides a non-web based application bridge to extract information from the seller's system via the seller's non-web applications interface. The non-web based application bridge is employed via an interface supporting remote access based on CORBA, RMI, etc.

The SaleBridge software also includes a transaction bridge that can be used to interact with the seller's card processing application to process credit card purchases. For example, a buyer's credit card and shopping cart related information may be communicated to the seller's card processing application to complete a transaction for the buyer.

Figure 16:
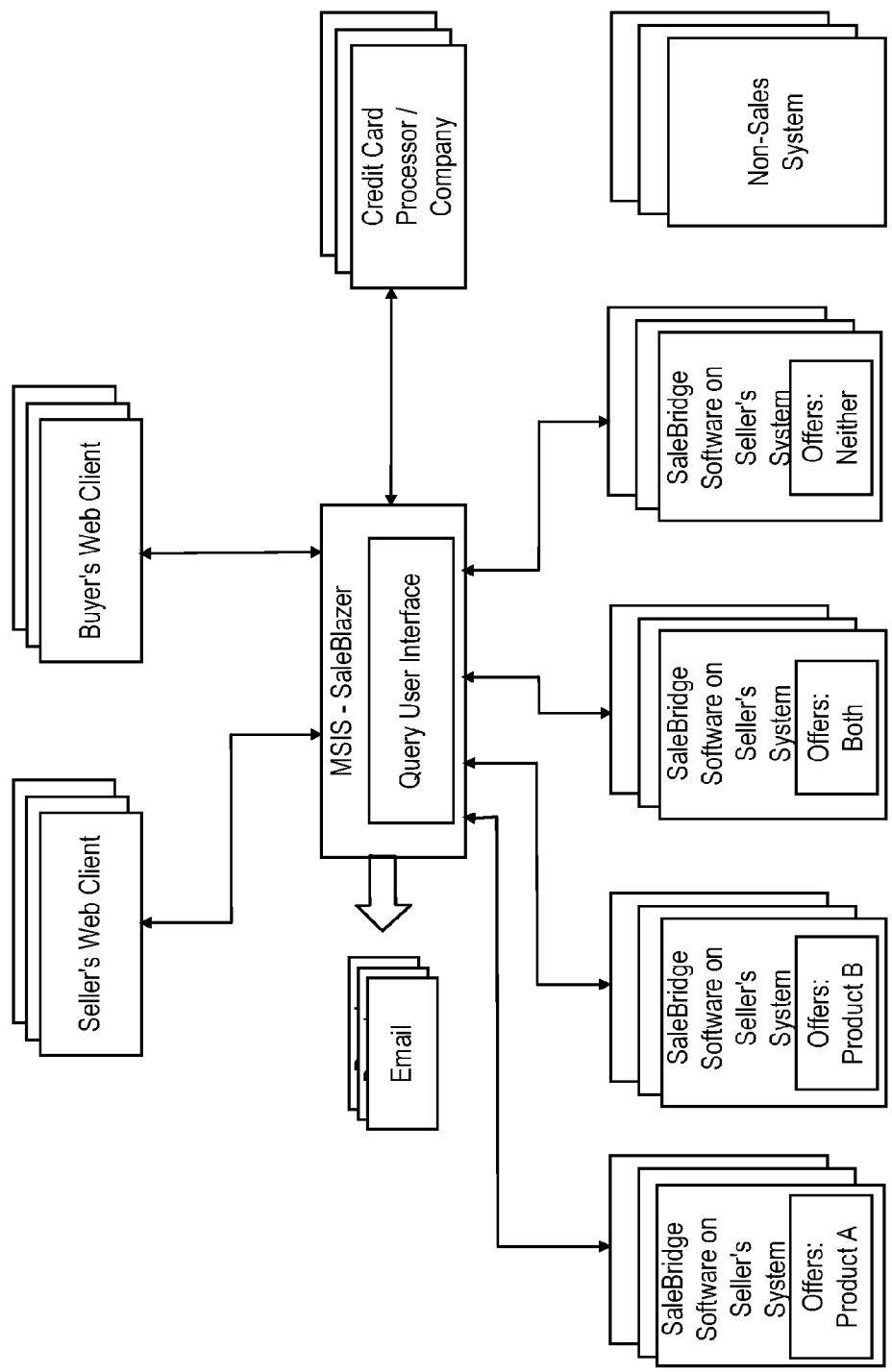
FIG. 16 illustrates an individual buyer interface system that runs on the MSIS of the present invention.

FIG. 16 illustrates an individual buyer interface system, SaleBlazer that runs on the MSIS. The interface may also be tailored to the corporate buyer, with extended functionality supporting, for example, scheduled buying and just-in-time delivery.

To interact with the SaleBlazer service, a buyer merely uses conventional web browser software on the buyer's computer. The buyer interacts to define a query relating to one or more desired products. The SaleBlazer service via the SalePoint Software identifies those of the plurality of participating sellers that might carry such products. Once defined, the SalePoint Software simultaneously communicates the query to SaleBridge Software at each of the identified participating sellers.

Using the query and transaction bridging approach of the present invention, each SaleBridge Software component performs a search of product, pricing, inventory, etc., databases based on the query. All sales information relating to each product identified in the search is delivered to the SalePoint Software for presentation to the buyer. The buyer may review, compare and select one or more of the products returned from one or more of the participating sellers. Caching of common queries on a day to day basis will also be supported by the SaleBlazer service to minimize communication overhead.

From an individual buyer's online perspective, the SaleBlazer service will perform a single transaction (e.g., credit card) processing of multiple product selections spanning more than one seller. Based on final configuration, the underlying transaction may actually involve (1) a plurality of transaction processes between each seller and the buyer using the buyer's credit card information, and/or (2) a single credit card transaction for the total from the buyer to the MSIS along with a plurality of transaction processes with each seller involving account information of the MSIS.

As part of the sales transaction or in follow up thereto, the SaleBlazer service will perform automated registration, warranty delivery and acceptance, maintenance contract offerings and purchases, and emailed product information regarding updates and upgrades services. Stored buyer profiles will minimize buyer interaction required to carry out sales transaction and such associated services.

Figure 17:
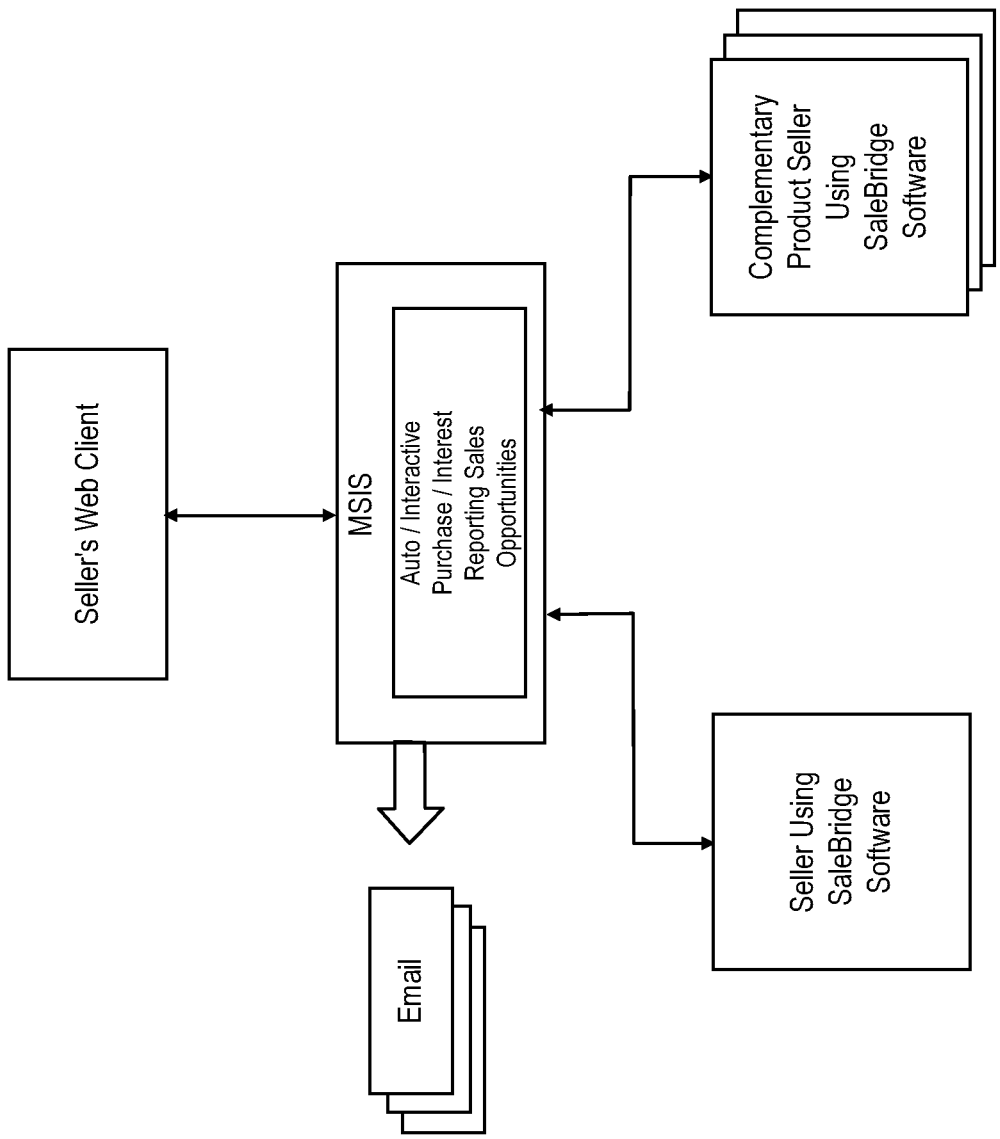
FIG. 17 illustrates an Opportunity Management application service that provides for up, cross and seller to seller opportunity management for automated, email-based target marketing without the need to release buyer or specific seller information to another participating seller in the present invention.

FIG. 17 illustrates an Opportunity Management application service that provides for up, cross and seller to seller opportunity management for automated, email based target marketing without the need to release buyer or specific seller information to another participating seller. For example, the Opportunity Management service will permit a first seller to contact a buyer that has completed a sales transaction for a product of a second seller. Similarly, a buyer showing interest but not buying one of a seller's products, can be automatically contacted via email offering another of the seller's products. The buyer may choose to remain anonymous and still receive such email through our email forwarding functionality of the Opportunity Management service.

Figure 18:
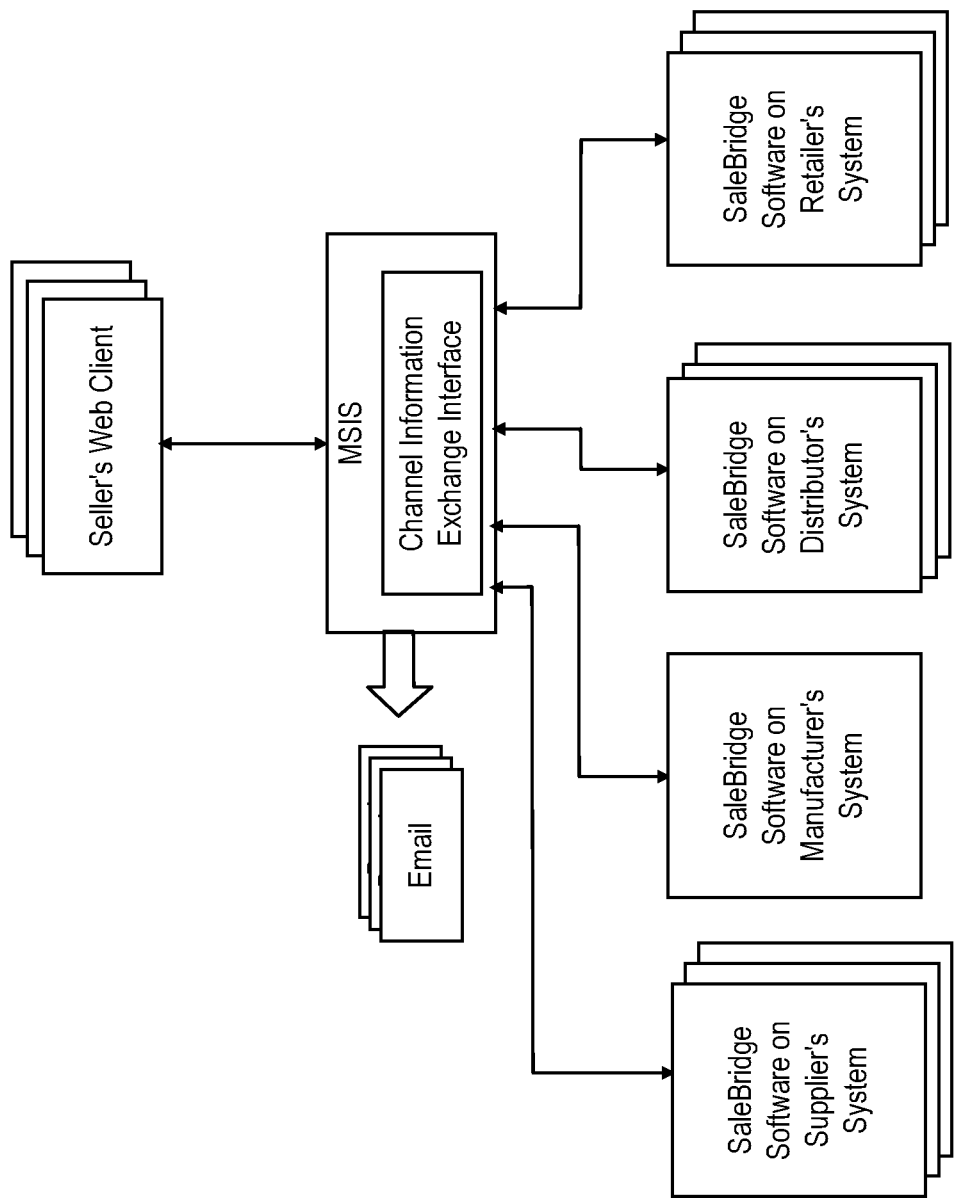
FIG. 18 illustrates Supply, Competition & Sales Channel Services ("Channel Services") offered in accordance with the present invention.
Figure 19:
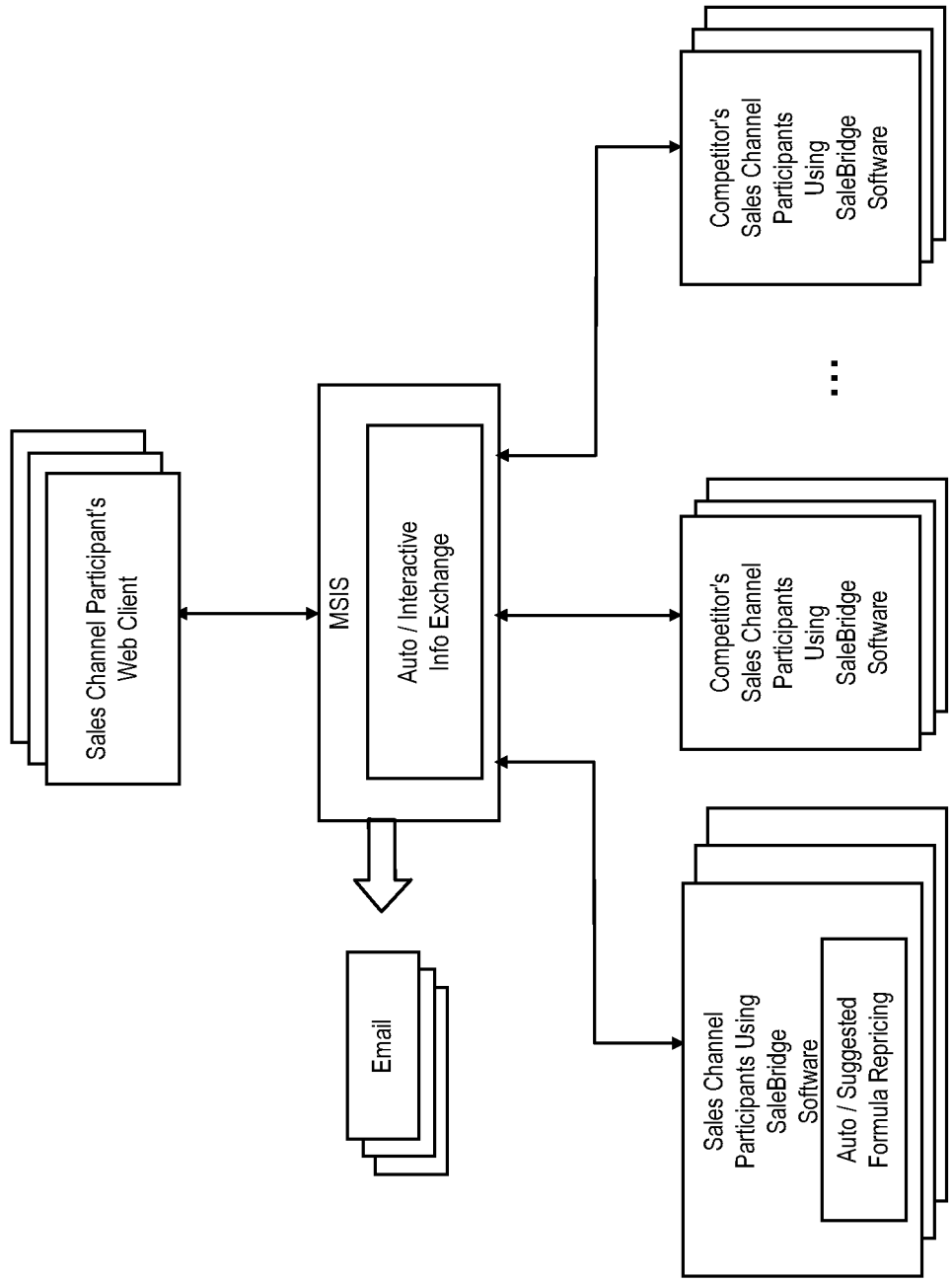
FIG. 19 illustrates Supply, Competition & Sales Channel Services ("Channel Services") offered in accordance with the present invention.

FIGS. 18 and 19 illustrate Supply, Competition & Sales Channel Services ("Channel Services") offered in accordance with the present invention. Each seller's sales system contains complete, real time public and private sales information. The Channel Services will provide each participating seller with access to other participating seller's sales information. For example, in response to manually or automatically generated queries from a seller, the Channel Services instantly deliver public information such as pricing and product descriptions from competing participating sellers. For queries generated within a sales channel (i.e., by a manufacturer and the manufacture's distributors and retailers), private information relating to each product such as inventory, inventory projections, numbers sold, margins, etc., can be instantly exchanged. Such public and private information will also be used by SFA (Sales Force Automation), ERP (Enterprise Resource Planning), and SC (Supply Channel) tool vendors to forecasting inventory, pricing, promotional activities (e.g., instant coupons, auctioning and rebate programs), and production planning, for example.

Figure 20:
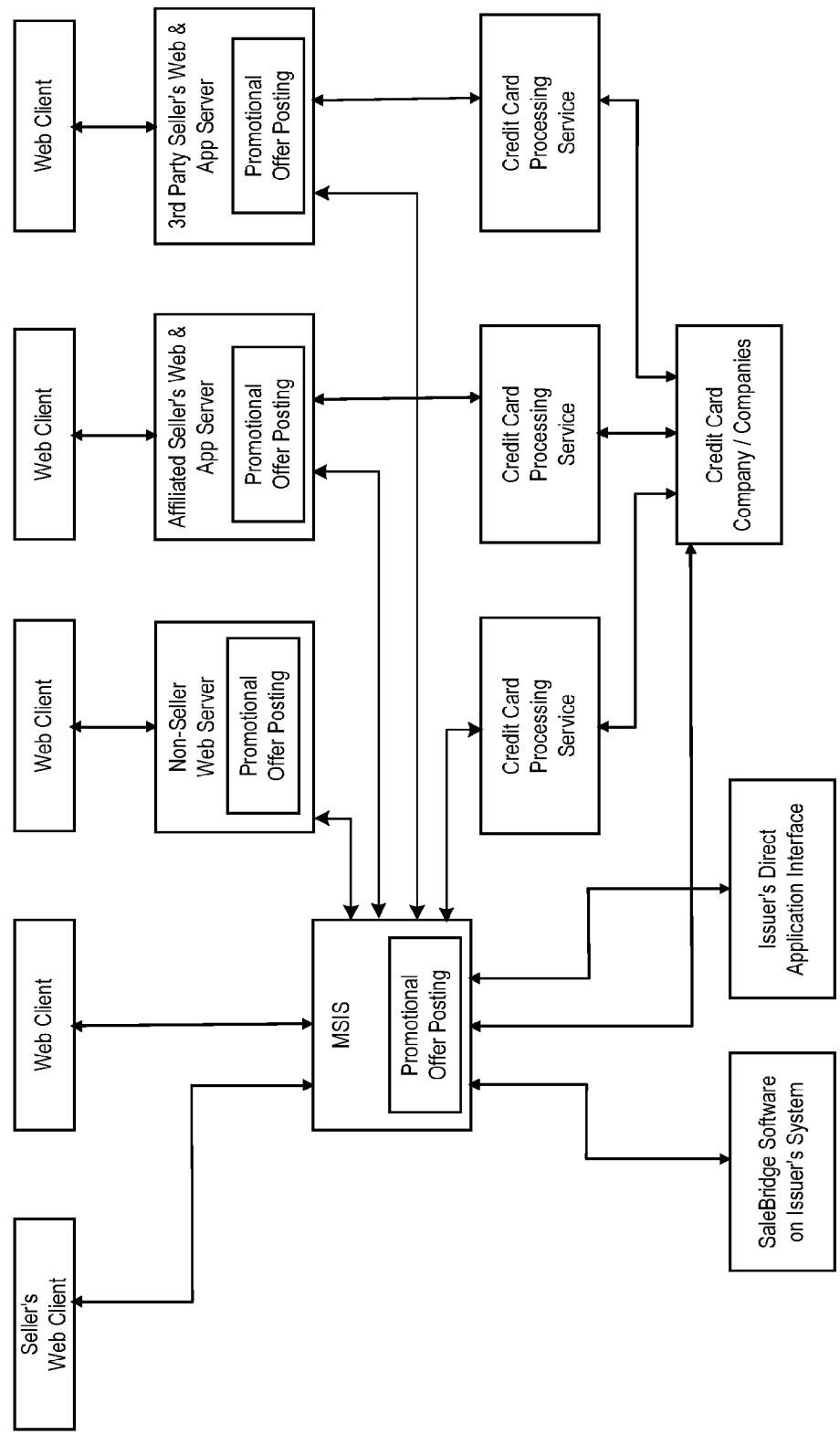
FIG. 20 illustrates Sales Promotion Services offered in accordance with the present invention.

FIG. 20 illustrates Sales Promotion Services offered in accordance with the present invention. Using the Sales Promotion Services, a buyer can generate a query from online rebate and coupon information for true instant processing, unlike current online rebate and coupon vendors who incorrectly claim to do the same. Further, queries may be generated from advertising information, e.g., online auction descriptions, online sales brochures, etc., whether or not such information originates within the MSIS.

Figure 21:
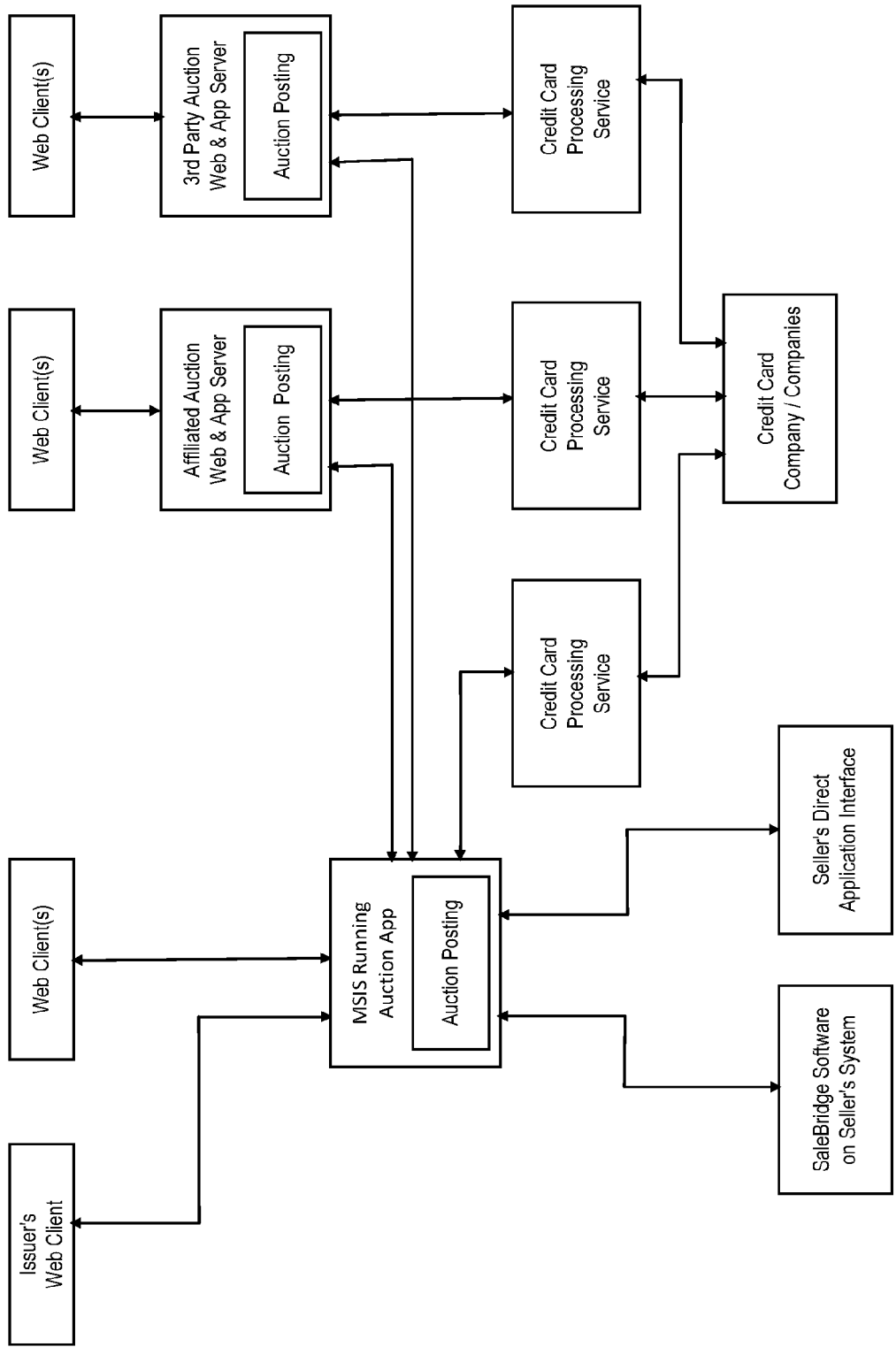
FIG. 21 illustrates an auction function offered in accordance with the present invention.

FIG. 21 illustrates an auction function offered in accordance with the present invention. The MSIS supports auctioning of products by one or more Seller's in an environment where a Buyer using a Web Client(s) can make a bid for one or more products put up for auction by a Seller via the Seller's Web Client software. The Sellers typically employ Auction Posting to which Buyers send bids. The MSIS Running Auction Application maintains bids offered by potential Buyers for one or more Auction Postings put up for auction by Sellers. When the Seller selects one or more Buyers to consummate an auction sale, the MSIS makes it possible to execute credit-card based transactions employing the Credit Card Processing Service and one or more Credit Card Companies.

Figure 22:
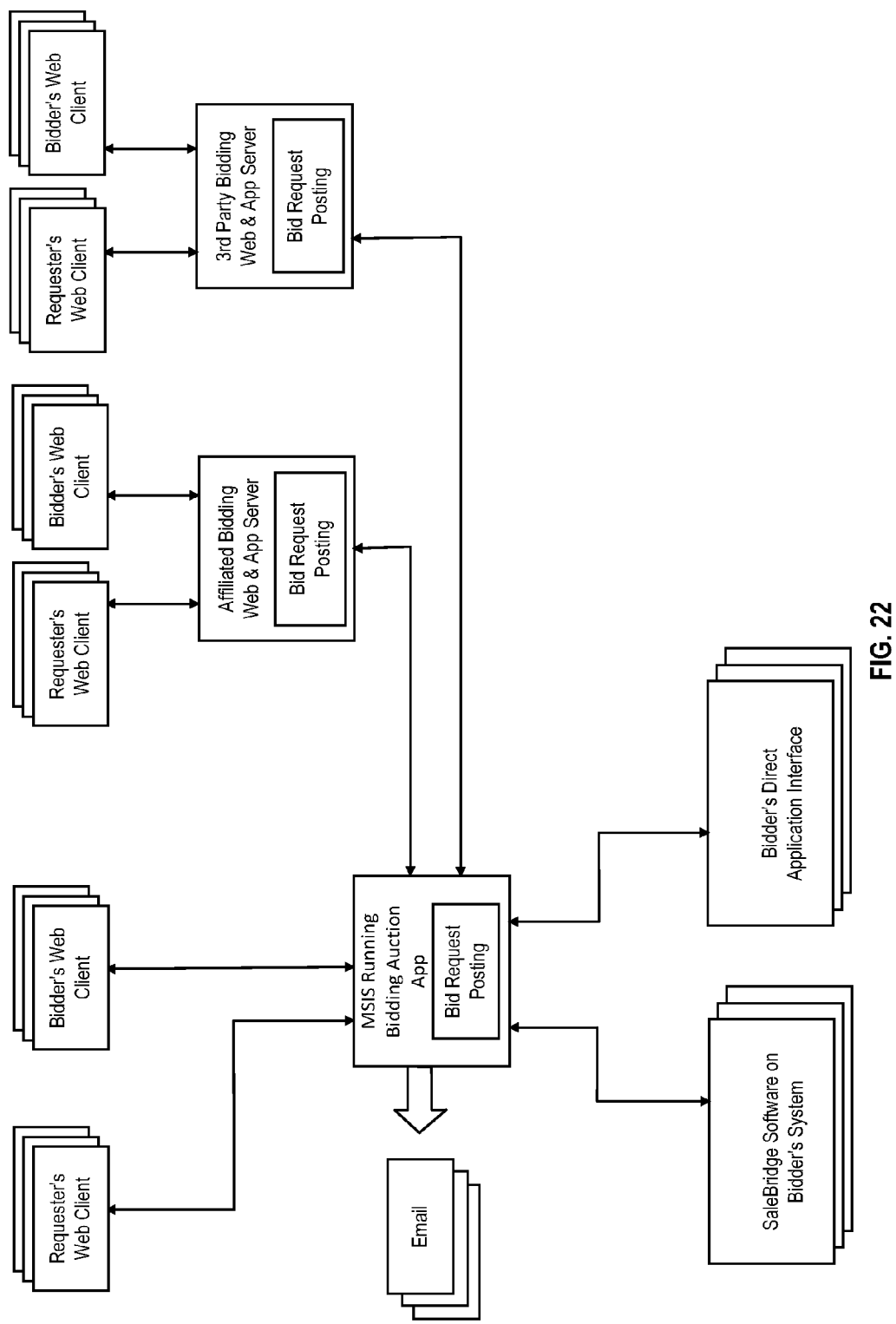
FIG. 22 illustrates a Corporate and Government Bidding Service offered in accordance with the present invention.

FIG. 22 illustrates a Corporate and Government Bidding Service offered in accordance with the present invention. The MSIS can be used as a bid processing system to support bidding by multiple Seller's to meet the requirements of Buyers, typically corporate buyers. The MSIS Running Bidding Application interacts with multiple Sellers who can participate in the bidding process in response to a bid request posting (BRP) from Buyers. Buyers or Requesters can access bidding information on the MSIS via the Requester's Web Client. Using the Bidder's Web Client, Bidders can review or selectively change their bids and also review the status of the BRP.

SaleBridge Software on Bidder's System is employed by the MSIS to interact with the bidder's system and periodically update information on the status on bids. In addition, the inventory of various products available on the bidder's system is selectively accessed by the MSIS via the SaleBridge.

Requesters using a Requester's Web Client and Bidders using a Bidder's Web Client may interact with the MSIS via an Affiliated Bidding Web & App Server, which selectively sends Requests or bids to the MSIS and provides information about them to Requesters and Bidders. Similarly, 3rd Party Bidding Web & App Servers employ the services of the MSIS to save bid-related information and to conduct the bid resolution activities. The various participants in the request and bidding process are periodically informed about the status of the bids via email. When bids are decided and the Requester selects a Bidder, say a lowest bidder, the MSIS facilitates the execution of the transactions to consummate the purchase of the products by the Requester.

In one embodiment, the MSIS automatically provides to the Requester a reference bid that comprises lowest bids for individual products from multiple Bidders, thereby assembling the lowest total bid to be used, whether as a reference or as an actual bid which can be used for purchase by the Requester. Multiple Sellers may be included in such a reference bid. When multiple Bidders are selected by a Requester, where each Bidder supplies part of the Request, the MSIS facilitates the completion of the purchase by the Request from multiple Bidders.

FIG. 23 is a schematic diagram of an Integrated Channel System comprising an Integrated Channel Service Manager, a manufacturer environment comprising an Inventory system, a Pricing system, a Configuration system, and an Order fulfillment system, a Reseller system for Reseller A comprising an inventory system and an order system, a Reseller system for Distributor B comprising a Seller's system, and a Retailer system for Retailer C comprising a Seller's system. In addition, a retailer sales system for Retailer C is also incorporated.

In general, the Integrated Channel Service Manager communicates with SalesBridge software integrated with individual Seller systems. Specifically, the Integrated Channel Service Manager communicates with the SalesBridge software installed with each of the Seller systems, namely, the manufacturer environment, Reseller A, Distributor B, and Retailer C.

More specifically, the Integrated Channel Service Manager sends queries related to order status, inventory levels, pricing and product configuration to the manufacturer environment and receives information from the manufacturer environment. It also selectively sends information related to product sales, pricing, inventory, order status, etc. retrieved from Reseller A and Distributor B to the manufacturer environment. In addition, the Integrated Channel Service Manager facilitates the selective exchange of sales, inventory, pricing, configuration, order status, etc. between the manufacturer environment, the Reseller A, Distributor B and Retailer C. Such selective exchange of information between the manufacturer environment, Reseller A and Reseller B occurs via the SalesBridge software integrated with their respective systems, under the supervision or control of the Integrated Channel Service Manager.

As discussed above, quite often, manufacturers of products employ several distributors, resellers and retailers to sell their products. Often these distributors and retailers have their own internet sales presence and endeavor to sell the manufacturers products on the internet. One of the common problems faced by these distributors and retailers is their inability to assure Buyers of the availability of products, whether the product is coming from their own or the manufacturer's inventory. This causes problems during order fulfillment activities after a Buyer makes a purchase and delay in delivery follows. In general, manufacturers do not have the ability to determine the sales executed by their various retailers and distributors. This causes (the Seller) problems in determining production targets.

These problems are solved by integrating the sales, order fulfillment and manufacturing systems of all sellers in the channel, as shown, for example, in FIG. 23. Such integration is facilitated by the Integrated Channel service Manager and the individual SalesBridge software incorporated in the software of each of the partners in the channel.

Specifically, in the manufacturing environment, in accordance with the present invention, the sales systems of manufacturers and their distributors is integrated with (a) the order fulfillment systems of the manufacturer and all the resellers and distributors, (b) the inventory management systems of the manufacturer, (c) the pricing systems of the manufacturer(s) and distributors (d) the promotion systems of all Sellers, and (e) the Configuration systems of the manufacturer which may be shared by all the distributors and resellers. This makes it possible to not only provide the ability to fulfill orders for an individual Buyer from multiple sellers (i.e. one or more distributors and manufacturers) but also the ability to incorporate different pricing schemes and promotional schemes in fulfilling the order. In addition, such integration makes it possible to incorporate information about the inventory levels of the manufacturer and distributors in determining the delivery date and shipping costs for the Buyer.

In an environment where a manufacturer is not directly involved, such as in a sales environment incorporating a large master reseller and their distributors and retailers, the sales systems of master resellers and their distributors and retailers is integrated with each Seller's (a) order fulfillment systems, (b) inventory management systems, (c) pricing systems, and (d) promotion systems to accrue the benefits described in the previous paragraph.

Often a Seller, such as a manufacturer, desires to determine the selling price of specific Products being offered for sale by other online Sellers, and their current inventory levels of those Products, especially if the other Sellers are the Seller's own distributors. This, however, is not easy. Such information may be gathered by visiting the online sales sites of various Sellers (distributors) and browsing or executing queries on each of those sales sites to extract pricing information. However, the integration of the sales systems and inventory management systems of the various distributors and retailers of a Product manufacturer makes it possible for the manufacturer to extract pricing and inventory information from the various distributors and retailers. It is also possible for the manufacturer to not only provide the distributors and retailers with a centrally maintained and shared set of product information and marketing collateral, but also provide forecasts of future pricing changes, delivery schedules, manufacturing schedules and inventory levels.

Another benefit of such integration is the ability to control promotions. For example, the integration of sales and inventory systems from multiple sellers such as those of a manufacturer and the manufacturer's distributors and retailers would make it possible to control the flow of promotional offerings (coupons, rebates, etc.) in an automated way that would also permit adjusting the promotional offerings dynamically to meet sales targets. In such an integrated environment, the adjustments of promotional offerings is driven by several parameters, including the volume of sales from the distributors and retailers, the product inventory levels at various shelves and warehouses maintained by the manufacturer and distributors, the shelf life of the products, etc. In the online internet based sales environment, the value of coupons and rebates dispensed to Buyers are thus easily tracked altered dynamically.

The integration of sales systems from multiple sellers, especially the integration of sales systems of manufacturers and their distributors, makes it possible to determine the sale prices for similar products from different retailers and distributors that sell the same family of products from a manufacturer.

The partners of an integrated channel can retrieve configuration related information from the Manufacturer's configuration system, via the Integrated Channel Service Manager. Such information may also be selectively cached by the Integrated Channel Service Manager. The same is true for Pricing information. Similarly, catalogs of products may be maintained by the manufacturer which are then accessed by the resellers, distributors and retailers via the Integrated Channel Service Manager, and optionally directly from the manufacturer environment in coordination with the Integrated Channel Service Manager.

The integration of sales, order fulfillment, inventory management systems, pricing systems and promotion systems from various Selling entities that form a part of a manufacturer's channel organization is achieved by (a) specifying interactions between these systems, (b) identifying information exchange (c) specifying programming interfaces (APIs) and protocols for information exchange and (d) constructing transactional systems that support such interactions based on the protocols.

The interactions between the various systems are expressed as Use-Cases and scenarios. The Use-Cases also capture details of information exchange. Information exchange is typically expressed in terms of business objects such as Quotes, Line Items, Shopping Carts, Prices, Discounts, Orders, Contracts, etc. that are exchanged between systems. The actual transfer of information is carried out in one of two ways: (1) using XML based information structures for transfer of structured data between systems or (2) exchanging references to objects that are saved or instantiated in a common data exchange layer that is accessible to all participating systems.

In one embodiment of the present invention, the Integrated Channel Service Manager is capable of interacting with Seller's systems (manufacturers, resellers, distributors and retailers) employing a SalesBridge software that is installed on each of the Seller's systems. The SalesBridge software is used by the Integrated Channel Service Manager to execute queries sent to the Seller's systems from the Integrated Channel Service Manager. The Seller systems of the manufacturers, resellers, distributors and retailers, in response, return shopping carts with prices back to the Integrated Channel Service Manager. In general, the SalesBridge is used by the Integrated Channel Service Manager as a remote database layer that is capable of translating queries received from the Integrated Channel Service Manager into queries and processes that retrieve the requested information, such as configuration, pricing and inventory, from the Seller's Sales and other software.

The Integrated Channel Service Manager includes one or more web server software components with which Buyers' computers interact, one or more Application server software components that provide various Sales services to Buyers accessing them over the internet, and one or more Sales databases that is used to save various kinds of information such as customer profile, saved quotes, product categories, etc.

Among other things, the Integrated Channel Service Manager also supports product category selection, search query formulation, instant coupon and rebate processing, shopping cart comparison, composite shopping cart review, shopping cart pricing and saved quote re-pricing, quote persistence and query persistence, scheduled delivery information from Buyers, customer profile auto transactions, opportunity management and sales agent support, automatic registration of products on behalf of Buyers, and Warranty management. In addition, it also includes a SalesBridge software interface that makes it possible to interact with the Seller's systems.

The Integrated Channel Service Manager activities include identifying potential Sellers for Buyers based on the Buyer's preferences and the actual inventory levels of the Sellers in the Channel. In addition, it identifies one or more Seller systems in the Channel as potential participants in a sale. Should the Buyer decide to consummate a sale based on the recommendation of Sellers by the Integrated Channel Service Manager, the Seller systems participating in the sale are informed of their role in fulfilling the Buyer's order by the Integrated Channel Service Manager. Subsequently, the order fulfillment systems of the Sellers are queried by the Integrated Channel Service Manager to retrieve order status information on behalf of the Buyer.

The Integrated Channel Service Manager assists Buyers in generating a query for subsequent submission of those queries to Seller's systems. Queries can take the form of old saved quotes or shopping carts, coupons selected, rebates selected, query text, third party shopping carts, sales brochures, persistent queries, etc. The Integrated Channel Service Manager preprocesses Buyer specified queries and delivers them to selected Seller systems that are identified based on one or more search criteria including, in some cases, product categories, customer profiles, inventory levels, pricing information, etc.

When the Seller's systems respond with product and pricing information, for example, with priced shopping carts that include all or a subset of the Buyer's product list, the Integrated Channel Service Manager presents the information to Buyer for interaction with the Buyer. Optionally, such information is presented as a comparison of products and prices.

Typically, if a Buyer's order cannot be fulfilled by one individual Seller, the Integrated Channel Service Manager responds to Buyer's specification of product and pricing selection by interacting with one or more corresponding Seller's systems to complete the sales transactions. Subsequently, the Integrated Channel Service Manager performs post sales functions which selectively include registration, warranties, updates, maintenance contracts, opportunity management etc. Opportunity management is employed to generate additional sales or repeat sales.

In one embodiment, in order to share information in the channel, the Integrated Channel Service Manager provides an information exchange layer that is populated with relevant data extracted from each of the participants in the Integrated Channel. Such information is later accessed by other participants under the control and coordination of the Integrated Channel Service Manager. The information exchange layer is implemented using an object-oriented database, objects of information being transferred to or retrieved from the participants of an Integrated Channel as XML based structured data. In another embodiment, the information exchange layer maintained by the Integrated Channel Service Manager is an object-oriented layer of software and associated processing software implemented over a relational database.

The Integrated Channel Service Manager thus makes it possible to provide a Buyer with a quote for the set of products the Buyer desires, the quote being assembled from information extracted from one or more participants of the Integrated Channel System and including products and prices provided by one or more of such participants. When such a quote is found acceptable by the Buyer and the Buyer places an order based on the quote provided, the Integrated Channel Service Manager disassembles the quote to provide relevant portions of the quote to the actual participant selling the product to the Buyer as sub-quotes, and then forwards the sub-quotes to the participants involved. The Integrated Channel Service Manager selectively, when required, executes credit card processing to execute a single sales transaction for the Buyer that covers all of the sub-quotes, and thus stands in and executes sales transactions on behalf of all the participants. In addition, order status information is retrieved, as necessary and when required, to enable the Buyer to follow-up on the order placed.

FIG. 24 is a schematic diagram of an Integrated Channel System comprising an Integrated Channel Service Manager and a manufacturer environment. The manufacturer environment comprises a data warehouse, a data mining system, and a SalesBridge software component, a Pricing system and an Order fulfillment system (and other Configuration and Inventory Systems not shown). The Integrated Channel System further comprises a Reseller system for Reseller A comprising an inventory system and an order system, a Reseller system for Distributor B comprising a Seller's system, and a Retailer system for Retailer C comprising a Seller's system.

In general, the Integrated Channel Service Manager communicates with SalesBridge software integrated with individual Seller systems. Specifically, the Integrated Channel Service Manager communicates with the SalesBridge software installed with each of the Seller systems, namely, the manufacturer environment, Reseller A, Distributor B, and Retailer C.

More specifically, the Integrated Channel Service Manager sends queries related to order status, inventory levels, pricing, and product configuration to the manufacturer environment and receives information from the manufacturer environment. It also selectively sends information related to product sales, pricing, inventory, order status, etc. retrieved from Reseller A and Distributor B to the manufacturer environment. In addition, the Integrated Channel Service Manager facilitates the selective exchange of sales, inventory, pricing, configuration, order status, etc. between the manufacturer environment, the Reseller A, Distributor B and Retailer C. Such selective exchange of information between the manufacturer environment, Reseller A, Distributor B and Retailer C occurs via the SalesBridge software integrated with their respective systems, under the supervision or control of the Integrated Channel Service Manager.

As discussed above, quite often, manufacturers of products employ several distributors, resellers and retailers to sell their products. Often these distributors and retailers have their own internet sales presence and endeavor to sell the manufacturers' products on the internet. One of the common problems faced by these distributors and retailers is their inability to assure Buyers of the availability of products, whether the product is coming from their own or the manufacturer's inventory. This causes problems during order fulfillment activities after a Buyer makes a purchase and delay in delivery follows. In general, manufacturers do not have the ability to determine the sales executed by their various retailers and distributors. This causes (the Seller) problems in determining production targets.

These problems are solved by integrating the sales, order fulfillment and manufacturing systems of all sellers in the channel, as shown, for example in FIG. 24. Such integration is facilitated by the Integrated Channel Service Manager and the individual SalesBridge software incorporated in the software of each of the partners in the channel.

SalesBridge software, in addition to facilitating sales transactions and providing a querying interface, also provides support for the following services:
 Mapping tool
 Data WareHousing
 Data Mining As sales software and the ERP market becomes more mature, a critical need arises for tools that allow two communicating systems to query each other and selectively exchange data. An obvious example of this is the scenario where a company is using SAP as their back-office system, and wishes to make it interact with the SalesBridge software. An overriding concern for customers will probably be SalesBridge integration with their current system. The front office suite (e.g., Multi Seller Interface System (MSIS>> or the Integrated Channel System would need to be able to send quotes, configurations, pricing details, etc. to a seller having SAP for order fulfillment, inventory and manufacturing. The main point of integration then becomes the data exchange that needs to take place: The SalesBridge software translates its quote object and its config object into the details the SAP system needs, and sends those details to the SAP database. In addition, the SalesBridge software translates queries sent by the Integrated Channel System or MSIS into queries that can be executed on the databases or back-office systems available at the Seller (e.g., the manufacturer, reseller, distributor or retailer).

SalesBridge MapTool (or simply MapTool) is a data mapping system or tool. It consists of the three pieces mentioned above:

a) a GUI and programmatic events that allow a consultant to map SalesBridge objects to/from fields and tables in a foreign database;

b) a data transfer engine which (at run time) connects to the foreign database and allows the actual transfer of information between the two systems; and c) a report kit that provides reporting functionality.

In addition, the SalesBridge software makes use of some of the artifacts captured by the SalesBridge MapTool to extract information, save information and to modify information, as necessary, in the database or associated software systems at the Seller's environment.

Details of the Mapping Activity

The mapping between the Seller's database or run-time systems and the SalesBridge component is performed as follows:

1. The MapTool, using JDBC or ODBC (or JDBC/ODBC) based programming api's, interacts with the foreign database (Seller's database) and retrieves schema information using Seller provided username and passwords.

2. The MapTool accesses SalesBridge metadata information from the SalesBridge software (or retrieves them from the MSIS system) to identify mapping requirements.

3. The MapTool facilitates the creation of mapping information for mapping the SalesBridge metadata to the Seller's database.

4. It also identifies mapping necessary but not possible, so that it may be remedied via additional tables created in the Seller's and or SalesBridge environment.

5. It also facilitates identification of metadata mapping that is to be supported by programmatically creating mapping code components.

Once the mapping is created, it is saved in the SalesBridge component at the Seller's environment.

Mapping is used, for example, for all the following types of information handled by the SalesBridge software:
 Inventory
 Product Information Configuration
Pricing
Supplier Related Information
Promotional Information
Order Fulfillment
Transaction Completion (Credit Card Info, etc.)
Order Status
Shipping
Billing
Other . . .

While SalesBridge enables the Seller to execute sales, inventory and other related activities, it is desirable to facilitate the collection, processing and archival of such information over time in a Data Warehouse. The SalesBridge software, via its MapTool, makes it possible to not only map sales, inventory and other related information into a Data Warehouse, but also makes it possible to populate such a Data Warehouse with relevant information at run-time. This enables the SalesBridge software to act as an interface to the Data Warehouse for other systems on an Integrated Channel System or an MSIS system.

Thus, SalesBridge Data Warehouse capabilities include:

Providing a means of creating a mapping between sales, inventory and other related information and a data warehouse.

Providing means to save such mapping information in the SalesBridge.

Providing the means to selectively populate such a Data Warehouse at run-time.

Providing means to retrieve information from the Data Warehouse using the SalesBridge querying interface as well as by a special Data Warehouse service.

Additionally, the SalesBridge software can be installed with its own Data Warehouse so as to provide warehousing services to the Seller.

Data Mining is supported by SalesBridge by providing an ad hoc querying interface to a Data Warehouse that is populated. Such ad hoc querying interface makes it possible for other managers of information in the Integrated Channel system or at the Seller's environment to extract information to enhance their decision making capabilities. In addition, third party decision support systems are provided an interface to interact with the Data Mining service.

The partners of an integrated channel can perform Data Mining transactions and retrieve configuration, pricing, different types of forecasts, sales, marketing, and other related information from the Manufacturer's Data Warehouse using the Data Mining tool. The access to such information is coordinated by the Integrated Channel Service Manager. Such information may also be selectively cached by the Integrated Channel Service Manager. The same is true for access to archived information maintained by the manufacturer at the Data Warehouse. Similarly, statistical information on products and sales may be maintained by the manufacturer which is then accessed by resellers, distributors and retailers via the Integrated Channel Service Manager, the SalesBridge software and the Data Mining Tool. Optionally, a reseller or retailer can directly access such information from the manufacturer environment by interacting with the SalesBridge software in coordination with the Integrated Channel Service Manager.

The integration of a Data Warehouse and Data Mining tool that forms a part of a manufacturer's channel organization is achieved by a) specifying interactions between these systems and the SalesBridge, b) identifying information exchange, c) specifying programming interfaces (APIs) and protocols for information exchange between these systems and the Sales-Bridge; and d) constructing transactional systems that support such interactions based on the protocols.

The interactions between the various systems are expressed as Use-Cases and scenarios. The Use-Cases also capture details of information exchange. Information exchange is typically expressed in terms of business objects such as Quotes, Line Items, Shopping Carts, Prices, Discounts, Orders, Contracts, etc. that are exchanged between systems. The actual transfer of information is carried out in one of several ways: a) using XML based information structures for transfer of structured data between these systems and the SalesBridge software, b) exchanging references to objects that are saved or instantiated in a common data exchange layer that is accessible to all participating systems, c) providing a query interface on the Data warehouse and the Data Mining tool that is accessed by the SalesBridge software, or d) providing a set of application programming interfaces using programs written to enable the SalesBridge software to interact with the Data Warehouse and the Data Mining tool.

The SalesBridge software is used by the Integrated Channel Service Manager to execute Data Mining queries sent to the Seller's systems from the Integrated Channel Service Manager or from other resellers and retailers in the Channel. The Seller's systems of the manufacturers, resellers, distributors and retailers, in response, return the retrieved information, if any, back to the Integrated Channel Service Manager or to the Seller that sent the query. In general, the SalesBridge software is used by the Integrated Channel Service Manager as a remote database layer that is capable of translating queries received from the Integrated Channel Service Manager into queries and processes that retrieve the requested information from the Data Mining tool or directly from the Data Warehouse.

The SalesBridge software is used to populate data into the Data Warehouse, either directly or via a pipeline of processing software that massages the data before entering it into the Data Warehouse.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and appended diagrams.

The invention claimed is:

1. A sales portal system supporting a plurality of buyer computers used by a corresponding plurality of buyers, the sales portal system comprising:
a server system communicatively coupled during operation to:
a first seller's computer used by a first seller to support sales of a product, the product having a first description and a first price, both the first description and the first price being stored in a first database on the first seller's computer having a first storage format;
a second seller's computer used by a second seller to support sales of the product having a second description and a second price, both the second description and the second price being stored in a second database on the second seller's computer having a second storage format that differs from the first storage format, and the first seller being a competitor of the second seller; and
one or more of the plurality of buyer computers, wherein:

the server system responds to a query received from one of the plurality of buyer computers by delivering a first seller rating and a second seller rating, the first description and the first price from the first database, and the second description and the second price from the second database, to the one of the plurality of buyer computers, including reformatting at least two of the first description, the first price, the second description, and the second price; and the server system managing a sales transaction of the product from one of the first seller and the second seller as identified by the one of the plurality of buyer computers.

2. The sales portal system of claim 1, further comprising storage that stores at least a portion of the first description and the first price and at least a portion of the second description and the second price correspondingly received from the first seller's computer and the second seller's computer.

3. The sales portal system of claim 1, wherein the server system, based upon the query, accesses the first description and first price and the second description and second price from the first seller's computer and the second seller's computer, respectively.

4. The sales portal system of claim 1, wherein the first seller rating differs from the second seller rating.

5. The sales portal system of claim 1, wherein the server system is operable to:
process payment for the sales transaction; and
transmit the payment to a corresponding one of the first seller and the second seller.

6. The sales portal system of claim 5, wherein the server system is further operable to assess a fee for facilitating the sales transaction.

7. The sales portal system of claim 6, wherein the fee is based upon value of the payment.

8. The sales portal system of claim 5, wherein the payment processed is a credit card payment.

9. The sales portal system of claim 8, wherein the server system spreads the sales transaction over multiple credit cards.

10. The sales portal system of claim 1, wherein the server system further facilitates warranty registration for the product.

11. The sales portal system of claim 1, the server system further:
accesses at least one promotion corresponding to the product; and
applies the at least one promotion to the sales transaction.

12. The sales portal system of claim 11, wherein the at least one promotion comprises one or both of an instant coupon and a rebate.

13. The sales portal system of claim 11, wherein the server system accesses the at least one promotion by:
querying the buyer's computer; and
receiving the at least one promotion from the buyer's computer.

14. The sales portal system of claim 1, where the server system further interacts with one or both of the first seller's computer and the second seller's computer to identify the buyer.

15. The sales portal system of claim 1, where the server system further interacts with the buyer's computer to identify the buyer.

16. The sales portal system of claim 1, where the server system:
identifies the buyer;
accesses user profile data based upon the identity of the buyer; and
selects the first seller and the second seller based upon the user profile data.

17. The sales portal system of claim 1, where the server system identifies the buyer for subsequent presentation of promotions.

18. The sales portal system of claim 1, wherein the server system presents a shopping cart to the buyer's computer having the product represented therein.

19. The sales portal system of claim 18, wherein the server system uses customer profile data corresponding to the buyer to create the shopping cart.

20. The sales portal system of claim 18, wherein the server system presents delivery options for the product with the shopping cart.

21. The sales portal system of claim 1, wherein the server system:
receives a query relating to one or more desired products; and
selects the product based upon the query.

22. The sales portal system of claim 21, wherein the selecting the product based upon the query is further based upon available inventory.

23. The sales portal system of claim 1, wherein the server system further presents shipping costs to the buyer's computer respective to the first seller and the second seller.

24. The sales portal system of claim 1, wherein the server system transmits an email to the buyer's computer confirming the sales transaction.

25. The sales portal system of claim 1, wherein the server system uses a common interface to access both the first seller's computer and the second seller's computer.

26. The sales portal system of claim 25, wherein the common interface to the first seller's computer and the second seller's computer resides on the server system.

27. The sales portal system of claim 25, wherein the common interface comprises:
a first interface resident on the first seller's computer; and
a second interface resident on the second seller's computer.

28. A method of supporting a plurality of buyer computers used by a corresponding plurality of buyers by a server system, the method comprising:
communicatively coupling to a first seller's computer used by a first seller to support sales of a product, the product having a first description and a first price, both the first description and the first price being stored in a first database on the first seller's computer having a first storage format; and
communicatively coupling to a second seller's computer used by a second seller to support sales of the product having a second description and a second price, both the second description and the second price being stored in a second database on the second seller's computer having a second storage format that differs from the first storage format, and the first seller being a competitor of the second seller; and
responding to a query received from one of the plurality of buyer computers by delivering a first seller rating and a second seller rating, the first description and the first price from the first database, and the second description and the second price from the second database, to the one of the plurality of buyer computers, including reformatting at least two of the first description, the first price, the second description, and the second price; and
managing a sales transaction of the product from one of the first seller and the second seller as identified by the one of the plurality of buyer computers.

29. The method of claim 28, further comprising storing at least a portion of the first description and the first price and at least a portion of the second description and the second price correspondingly received from the first seller's computer and the second seller's computer.

30. The method of claim 28, further comprising, based upon the query, accessing the first description and first price and the second description and second price from the first seller's computer and the second seller's computer, respectively.

31. The method of claim 28, wherein the first seller rating differs from the second seller rating.

32. The method of claim 28, further comprising:
processing payment for the sales transaction; and
transmitting the payment to a corresponding one of the first seller and the second seller.

33. The method of claim 32, further comprising assessing a fee for facilitating the sales transaction.

34. The method of claim 33, wherein the fee is based upon value of the payment.

35. The method of claim 32, wherein the payment processed is a credit card payment.

36. The method of claim 35, further comprising spreading the sales transaction over multiple credit cards.

37. The method of claim 28, further comprising facilitating warranty registration for the product.

38. The method of claim 28, further comprising:
accessing at least one promotion corresponding to the product; and
applying the at least one promotion to the sales transaction.

39. The method of claim 38, wherein the at least one promotion comprises one or both of an instant coupon and a rebate.

40. The method of claim 38, wherein accessing the at least one promotion comprises:
querying the buyer's computer; and
receiving the at least one promotion from the buyer's computer.

41. The method of claim 28, further comprising interacting with at least one of the first seller's computer and the second seller's computer to identify the buyer.

42. The method of claim 28, further comprising interacting with the buyer's computer to identify the buyer.

43. The method of claim 28, further comprising:
identifying the buyer;
accessing user profile data based upon the identity of the buyer; and
selecting the first seller and the second seller based upon the user profile data.

44. The method of claim 28, further comprising identifying the buyer for subsequent presentation of promotions.

45. The method of claim 28, comprising presenting a shopping cart to the buyer's computer having the product represented therein.

46. The method of claim 45, further comprising using customer profile data corresponding to the buyer to create the shopping cart.

47. The method of claim 45, further comprising presenting delivery options for the product with the shopping cart.

48. The method of claim 28, further comprising:
receiving a query relating to one or more desired products; and
selecting the product based upon the query.

49. The method of claim 48, wherein the selecting the product based upon the query is further based upon available inventory.

50. The method of claim 28, further comprising presenting shipping costs to the buyer's computer respective to the first seller and the second seller.

51. The method of claim 28, further comprising transmitting an email to the buyer's computer confirming the sales transaction.

52. The method of claim 28, further comprising using a common interface to access both the first seller's computer and the second seller's computer.

53. The method of claim 52, wherein the common interface to the first seller's computer and the second seller's computer is locally accessed.

54. The method of claim 52, wherein using the common interface comprises:
using a first interface resident on the first seller's computer; and
using a second interface resident on the second seller's computer.

* * * * *